(12) United States Patent
Koyanagi et al.

(10) Patent No.: US 11,509,785 B2
(45) Date of Patent: Nov. 22, 2022

(54) MEDIUM TRANSPORT APPARATUS AND IMAGE READING APPARATUS

(71) Applicant: SEIKO EPSON CORPORATION, Tokyo (JP)

(72) Inventors: Noriyuki Koyanagi, Kitakyushu (JP);
Tsuyoshi Yamanaka, Kitakyushu (JP);
Tomoyuki Mokuo, Kitakyushu (JP);
Tokujiro Okuno, Kitakyushu (JP);
Masahiko Mizoguchi, Kitakyushu (JP);
Masahiro Igarashi, Kitakyushu (JP);
Akifumi Sugano, Kitakyushu (JP);
Wataru Beppu, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/243,951

(22) Filed: Apr. 29, 2021

(65) Prior Publication Data
US 2021/0250457 A1 Aug. 12, 2021

Related U.S. Application Data

(63) Continuation of application No. 16/555,850, filed on Aug. 29, 2019, now Pat. No. 11,019,231.

(30) Foreign Application Priority Data

Aug. 31, 2018 (JP) ................. 2018-162891

(51) Int. Cl.
*H04N 1/04* (2006.01)
*H04N 1/00* (2006.01)
(Continued)

(52) U.S. Cl.
CPC ........... *H04N 1/00649* (2013.01); *B65H 1/04* (2013.01); *B65H 31/00* (2013.01);
(Continued)

(58) Field of Classification Search
CPC ........... H04N 1/00649; H04N 1/00533; H04N 1/00557; H04N 1/00604; B65H 1/04; B65H 31/00
See application file for complete search history.

(56) References Cited

U.S. PATENT DOCUMENTS 5,903,364 A 5/1999 Shih-Min
8,330,998 B2 12/2012 Yoshida et al.
(Continued)

FOREIGN PATENT DOCUMENTS

JP H10-006617 1/1998
JP 2008-168580 7/2008
(Continued)

*Primary Examiner* — Cheukfan Lee
(74) *Attorney, Agent, or Firm* — Workman Nydegger

(57) ABSTRACT

In a scanner, a medium transport apparatus includes an apparatus main body including a medium transport path from a supply unit, which supplies a medium, to a discharge unit, which discharges the medium, a switcher that switches an attitude of the apparatus main body with respect to a mounting surface on which the apparatus main body is mounted, and a controller that, when the attitude of the apparatus main body with respect to the mounting surface is switched, performs control in accordance with the attitude after the switching.

11 Claims, 17 Drawing Sheets

(51) Int. Cl.
    *B65H 1/04*         (2006.01)
    *B65H 31/00*       (2006.01)

(52) U.S. Cl.
    CPC ..... *H04N 1/00533* (2013.01); *H04N 1/00557* (2013.01); *H04N 1/00604* (2013.01)

(56) References Cited

U.S. PATENT DOCUMENTS

| | | | |
|---|---|---|---|
| 10,764,462 | B2 | 9/2020 | Miyauchi |
| 11,019,231 | B2* | 5/2021 | Koyanagi .......... H04N 1/00533 |
| 2007/0154248 | A1 | 7/2007 | Chen |
| 2007/0188818 | A1 | 8/2007 | Westcott |
| 2009/0103251 | A1 | 4/2009 | Suzuki et al. |
| 2011/0075226 | A1 | 3/2011 | Fujiwara |
| 2011/0228350 | A1 | 9/2011 | Wakaura |
| 2012/0307324 | A1 | 12/2012 | Tu |
| 2013/0163056 | A1 | 6/2013 | Yukiyoshi |
| 2013/0329262 | A1 | 12/2013 | Yamane |
| 2014/0002869 | A1 | 1/2014 | Takemoto et al. |
| 2017/0111535 | A1 | 4/2017 | Morimoto et al. |
| 2018/0093511 | A1 | 4/2018 | Taketsugu et al. |
| 2018/0257895 | A1* | 9/2018 | Kaneko .................. B65H 31/22 |
| 2019/0132455 | A1 | 5/2019 | MIyauchi et al. |
| 2019/0132464 | A1 | 5/2019 | MIyauchi et al. |
| 2019/0135000 | A1 | 5/2019 | Harris et al. |
| 2019/0297215 | A1 | 9/2019 | Miyauchi |

FOREIGN PATENT DOCUMENTS

| | | |
|---|---|---|
| JP | 2008-197191 | 8/2008 |
| JP | 2009-527143 | 7/2009 |
| JP | 2009-190346 | 8/2009 |
| JP | 2014-086819 | 5/2014 |
| JP | 2016-179907 | 10/2016 |
| JP | 2019-083428 | 5/2019 |
| JP | 2019-083429 | 5/2019 |
| JP | 2019-165362 | 9/2019 |

* cited by examiner

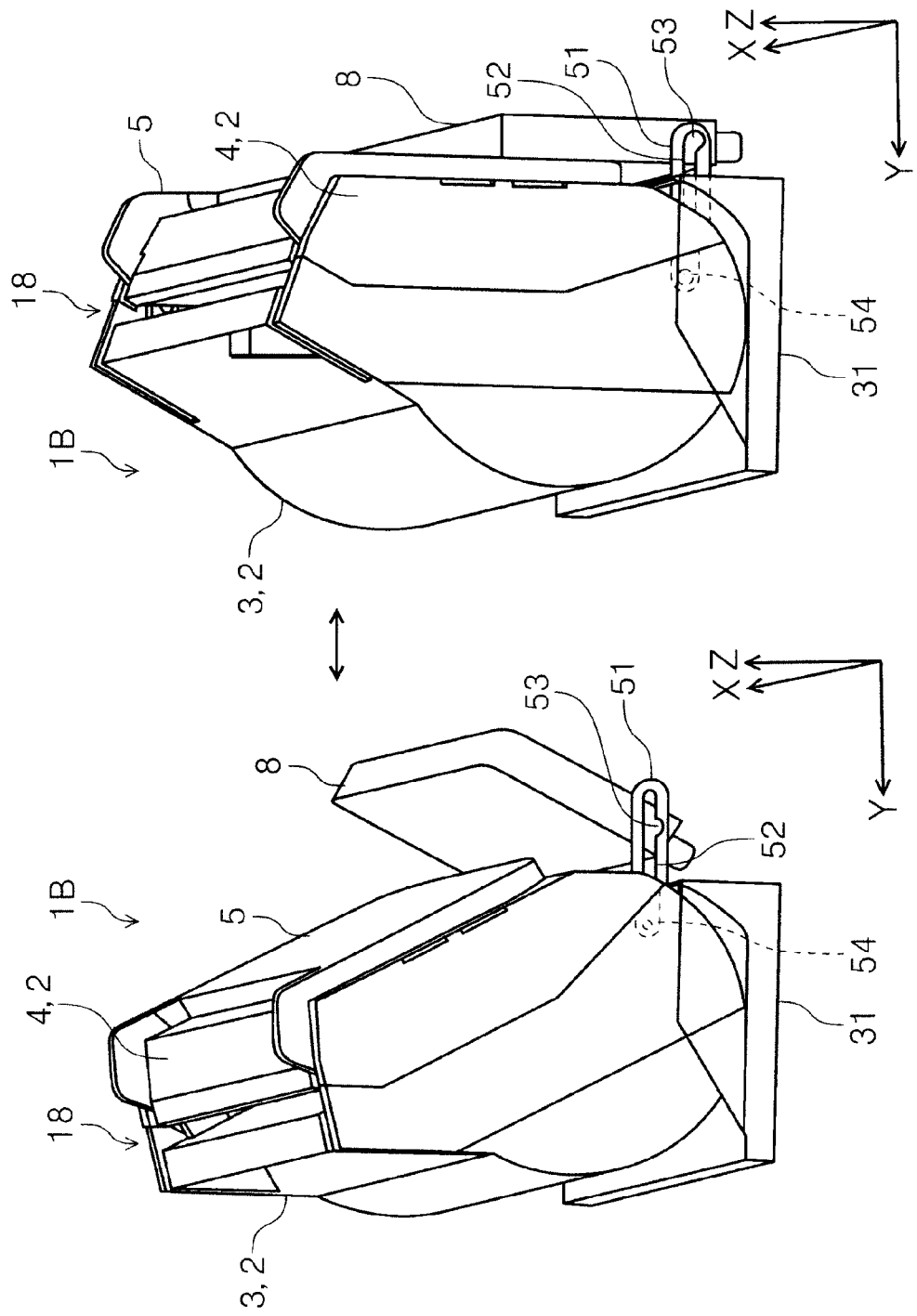

MEDIUM TRANSPORT APPARATUS AND IMAGE READING APPARATUS

The present application is a continuation of U.S. patent application Ser. No. 16/555,850, filed Aug. 29, 2019, which is based on, and claims priority from, JP Patent Application No. 2018-162891, filed Aug. 31, 2018, the disclosures of which are hereby incorporated by reference herein in their entireties.

BACKGROUND

1. Technical Field

The present disclosure relates to a medium transport apparatus that transports a medium, and an image reading apparatus that reads an image on a medium transported by the medium transport apparatus.

2. Related Art

A scanner, which is an example of an image reading apparatus, may be provided with, as a medium transport apparatus, an automatic feeding apparatus (also referred to as an auto document feeder (ADF)) for a medium that is a document and may automatically feed and read a plurality of media.

In addition, such an image reading apparatus as in, for example, JP-T-2009-527143, may be configured to be able to change an installation attitude by switching between a first state in which a sheet transport path provided in a casing forming an apparatus main body is inclined with respect to a horizontal direction, and a second state in which the sheet transport path is closer to the horizontal direction than in the first state.

In the first state of the image reading apparatus of JP-T-2009-527143, since the sheet transport path is inclined with respect to the horizontal direction, an increase in the size of the apparatus can be suppressed. In addition, in the second state, since the sheet transport path is closer to the horizontal direction than in the first state, when discharging a high-rigidity sheet, collision of the leading end of the sheet with a floor surface or the like on which the image reading apparatus is installed is avoided.

The installation attitude of such an image reading apparatus is changed in accordance with the installation environment and the use situation. For this reason, user-friendliness may differ depending on the attitude; however, this has not been taken into consideration in the existing image reading apparatus in which the installation attitude can be changed.

SUMMARY

A medium transport apparatus according to an aspect of the present disclosure includes an apparatus main body including a medium transport path from a supply unit, which supplies a medium, to a discharge unit, which discharges the medium, a switcher that switches an attitude of the apparatus main body with respect to a mounting surface on which the apparatus main body is mounted, and a controller that, when the attitude of the apparatus main body with respect to the mounting surface is switched, performs control in accordance with the attitude after the switching.

BRIEF DESCRIPTION OF THE DRAWINGS

FIG. 17 is a perspective view for explaining a modification of the first embodiment.

DESCRIPTION OF EXEMPLARY EMBODIMENTS

Figure 1:
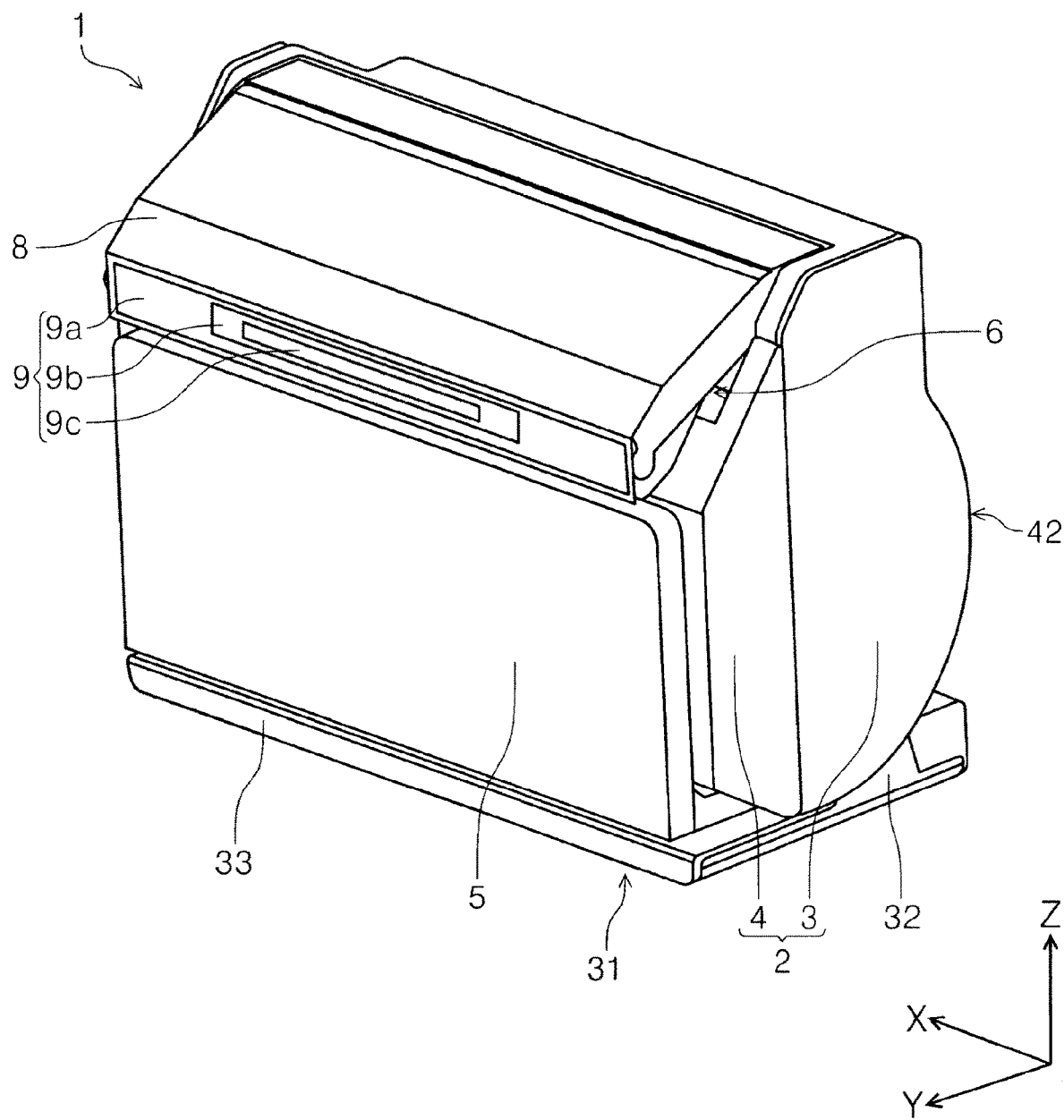
FIG. 1 is a perspective view illustrating a scanner when an apparatus main body is in a second attitude.

Hereinafter, the present disclosure will be schematically described.

A medium transport apparatus according to a first aspect of the present disclosure includes an apparatus main body including a medium transport path from a supply unit, which supplies a medium, to a discharge unit, which discharges the medium, a switcher that switches an attitude of the apparatus main body with respect to a mounting surface on which the apparatus main body is mounted, and a controller that, when the attitude of the apparatus main body with respect to the mounting surface is switched, performs control in accordance with the attitude after the switching.

According to this aspect, the controller is provided, when the attitude of the apparatus main body with respect to the mounting surface is switched, to perform control in accordance with the attitude after the switching. Accordingly, control is performed in accordance with the attitude of the apparatus main body with respect to the mounting surface, and therefore user-friendliness is improved.

In a second aspect according to the first aspect, the switcher is configured to switch the apparatus main body between a first attitude in which a discharge direction of the medium from the medium transport path takes a first inclination angle with respect to the mounting surface, and a second attitude in which the discharge direction takes a second inclination angle that is closer to a vertical angle than is the first inclination angle with respect to the mounting surface or in which the discharge direction is vertical.

In this aspect, in the medium transport apparatus capable of switching the apparatus main body between the first attitude in which the discharge direction of the medium from the medium transport path takes the first inclination angle with respect to the mounting surface and the second attitude in which the discharge direction takes the second inclination angle that is closer to the vertical angle than is the first inclination angle with respect to the mounting surface or in which the discharge direction is vertical, the operation effect of the first aspect can be obtained.

In a third aspect according to the second aspect, the switcher is configured to switch the apparatus main body to a third attitude in which the discharge direction takes a third inclination angle that is closer to a horizontal angle than is the first inclination angle with respect to the mounting surface or in which the discharge direction is horizontal.

In this aspect, the medium transport apparatus can be provided in which the apparatus main body can be switched to, in addition to the first attitude and the second attitude, a third attitude in which the discharge direction takes a third inclination angle that is closer to the horizontal angle than is the first inclination angle with respect to the mounting surface or in which the discharge direction is horizontal.

In a fourth aspect according to the second aspect or the third aspect, the controller turns off apparatus power when the apparatus main body is switched to the second attitude.

When the apparatus main body is set to the second attitude in which the discharge direction of the medium takes the second inclination angle that is closer to the vertical angle than is the first inclination angle or in which the discharge direction is vertical, the apparatus main body can be mounted in a space-saving manner. That is, the second attitude is an attitude suitable for storage of the medium transport apparatus when not in use.

In this aspect, because the controller turns off the apparatus power when the apparatus main body is switched to the second attitude, the apparatus power can be automatically turned off when the medium transport apparatus is to be stored after use.

In a fifth aspect according to the third aspect, the apparatus main body includes, at a top portion thereof, a displayer that displays content related to apparatus operation, and the controller, when the apparatus main body is in the first attitude, sets a display on the displayer to a first orientation in which the display is read, in plan view of the apparatus main body, with downstream down and upstream up in the discharge direction, and, when the apparatus main body is in the third attitude, sets the display on the displayer to a second orientation rotated clockwise or counterclockwise 90° from the first orientation.

When the apparatus main body of the medium transport apparatus is set to the first attitude, the user often performs operations facing toward the apparatus main body such that downstream faces toward the user and upstream faces away from the user, in the discharge direction. On the other hand, in the medium transport apparatus, when the apparatus main body is set to the third attitude, it is assumed that the user performs operations facing toward the apparatus main body such that the direction along the discharge direction becomes the left-right direction.

According to this aspect, the apparatus main body further includes, at a top portion thereof, a displayer that displays content related to apparatus operation, and the controller, when the apparatus main body is in the first attitude, sets the display on the displayer to a first orientation in which the display is read, in plan view of the apparatus main body, with downstream down and upstream up in the discharge direction, and, when the apparatus main body is in the third attitude, sets the display on the displayer to the second orientation rotated clockwise or counterclockwise 90° from the first orientation. Accordingly, the display orientation of the displayer can be set to a direction that is easy for the user to view in each attitude.

In a sixth aspect according to the third aspect, the controller, when the apparatus main body is in an attitude other than the first attitude or the third attitude, issues an alert and stops a transport operation in the apparatus main body.

According to this aspect, because the controller, when the apparatus main body is in an attitude other than the first attitude or the third attitude, issues the alert and stops the transport operation in the apparatus main body, it is possible to avoid the possibility that the transport operation is performed in a state in which the apparatus main body is set to an attitude other than the first attitude or the third attitude.

In a seventh aspect according to any one of the second aspect to the sixth aspect, the controller stops a transport operation when the switcher moves during medium transport in the apparatus main body.

According to this aspect, because the transport operation is stopped if the switcher moves during medium transport in the apparatus main body, the transport operation can be stopped when an operation to change the attitude of the apparatus main body is performed during medium transport in the apparatus main body.

In an eighth aspect according to any one of the second aspect to the sixth aspect, the medium transport apparatus further includes an operation restrictor configured to, under control of the controller, switch between a restricting state in which operation of the switcher is restricted and a permitting state in which operation of the switcher is permitted, in which the controller puts the operation restrictor in the restricting state during medium transport in the apparatus main body.

According to this aspect, because the medium transport apparatus further includes an operation restrictor that, under control of the controller, is capable of switching between a restricting state in which operation of the switcher is restricted and a permitting state in which operation of the switcher is permitted, and the controller puts the operation restrictor in the restricting state during medium transport in the apparatus main body, it is possible to suppress or prevent the attitude of the apparatus main body from changing during medium transport in the apparatus main body.

In a ninth aspect according to any one of the second aspect to the sixth aspect, the apparatus main body includes a lower unit forming a lower portion of the apparatus main body, and an upper unit configured to, by pivoting with respect to a pivot shaft provided on a discharge unit side, switch between a closed state in which the upper unit covers the lower unit and an open state in which the lower unit is exposed, in which the apparatus main body in the second attitude is configured such that the discharge unit faces downward, and a pivot restrictor configured to, under control of the controller, switch between a pivot restricting state in which pivoting of the upper unit from the closed state to the open state is restricted and a pivot permitting state in which pivoting of the upper unit from the closed state to the open state is permitted, in which the controller puts the pivot restrictor in the pivot restricting state when the apparatus main body is in an attitude other than the second attitude.

The apparatus main body includes the lower unit constituting the lower portion of the apparatus main body, and the upper unit configured to, by pivoting with respect to the pivot shaft provided on the discharge unit side, switch between the closed state in which the upper unit covers the lower unit and the open state in which the lower unit is exposed, and the apparatus main body in the second attitude is configured such that the discharge unit faces downward. For example, when the lower unit is in the open state in the first attitude or the third attitude other than the second attitude, if the upper unit is closed under its own weight due to a hand hitting it or the like, the impact may damage the upper unit, the lower unit, or internal components of the apparatus main body.

According to this aspect, because the controller puts the pivot restrictor in the pivot restricting state when the apparatus main body is in an attitude other than the second attitude, the upper unit can be prevented from opening when the apparatus main body is in an attitude other than the second attitude. As a result, it is possible to reduce the possibility of the upper unit in the open state being inadvertently closed and damaging the apparatus main body or internal components.

In a tenth aspect according to any one of the first aspect to the ninth aspect, the medium transport apparatus further includes a main body support member that supports the apparatus main body, in which the switcher is configured to switch the attitude of the apparatus main body by changing a support position of the apparatus main body supported by the main body support member.

According to this aspect, because the medium transport apparatus further includes the main body support member that supports the apparatus main body, and the switcher is configured to switch the attitude of the apparatus main body by changing the support position of the apparatus main body supported by the main body support member, the apparatus main body can be easily switched to a predetermined attitude.

In an eleventh aspect according to the tenth aspect, the switcher includes a fixer that fixes the main body support member and the apparatus main body.

According to this aspect, since the switcher includes the fixer that fixes the main body support member and the apparatus main body, the attitude of the apparatus main body can be maintained by fixing the main body support member and the apparatus main body.

In a twelfth aspect according to the first aspect to the eleventh aspect, the medium transport apparatus further includes a feed tray that is provided so as to pivot relative to the apparatus main body and is configured to switch between a first state in which the feed tray supports the medium to be fed to the medium transport path and a second state in which the feed tray covers a portion of the apparatus main body, and a discharge tray that is provided so as to pivot relative to the apparatus main body and configured to switch between a third state in which the discharge tray supports the medium discharged from the medium transport path, and a fourth state in which the discharge tray covers a portion of the apparatus main body, in which the feed tray in the second state and the discharge tray in the fourth state are configured not to cover an identical portion of the apparatus main body.

According to this aspect, because the feed tray in the second state and the discharge tray in the fourth state are configured so as not to cover the same portion of the apparatus main body, in other words, the feed tray in the second state and the discharge tray in the fourth state do not overlap, it is possible to suppress an increase in the size of the apparatus when the feed tray is set to the second state and the discharge tray is set to the fourth state.

In a thirteenth aspect according to the twelfth aspect, the medium transport apparatus further includes any one of an auxiliary feed tray configured to switch between a first advanced state in which the auxiliary feed tray is advanced to a free end side with respect to the feed tray and a first storage state in which the auxiliary feed tray is stored in the feed tray and an auxiliary discharge tray configured to switch between a second advanced state in which the auxiliary discharge tray is advanced to a free end side with respect to the discharge tray and a second storage state in which the auxiliary discharge tray is stored in the discharge tray.

According to this aspect, because the apparatus may include any one of an auxiliary feed tray that can switch between a first advanced state in which the auxiliary feed tray is advanced to a free end side with respect to the feed tray and a first storage state in which the auxiliary feed tray is stored in the feed tray and an auxiliary discharge tray that can switch between a second advanced state in which the auxiliary discharge tray is advanced to a free end side with respect to the discharge tray and a second storage state in which the auxiliary discharge tray is stored in the discharge tray, the medium can be more reliably supported by the feed tray or the discharge tray or both the feed tray and the discharge tray. In addition, an increase in the size of the apparatus can be suppressed.

In a fourteenth aspect according to any one of the first aspect to the thirteenth aspect, the medium transport apparatus further includes a connection portion that enables connection of a cable to the apparatus main body, in which the connection portion is disposed so as to enable insertion and removal of the cable regardless of the attitude of the apparatus main body.

According to this aspect, because the connection portion that enables connection of the cable to the apparatus main body is disposed so as to enable insertion and removal of the cable regardless of the attitude of the apparatus main body, the cable can be easily inserted into and removed from the connection portion.

An image reading apparatus according to a fifteenth aspect includes a reader that reads an image on a medium, and the medium transport apparatus according to any one of the first aspect to the fourteenth aspect that sends the medium toward the reader.

According to this aspect, in the image reading apparatus including the reader that reads the image of the medium and the medium transport apparatus that sends the medium toward the reader, the same operation and effect as any of the first aspect to the fourteenth aspect is achieved.

First Embodiment

First, an outline of an image reading apparatus according to an embodiment of the present disclosure will be described with reference to the drawings. In the present embodiment, as an example of the image reading apparatus, a scanner 1 capable of reading at least one of a front surface and a rear surface of a medium will be exemplified. The scanner 1 is a so-called document scanner that reads an original such as a document.

In the XYZ coordinate system illustrated in each drawing, the X direction is the apparatus width direction, and the Y direction is the apparatus depth direction. The Z direction indicates the height direction. In addition, the +Y direction side is the apparatus front side, and the—Y direction side is the apparatus rear side. In addition, when viewed from the apparatus front side, the left side is the +X direction, and the right side is the—X direction. In addition, the +Z direction is the upper side of the apparatus, and the—Z direction side is the lower side of the apparatus. In addition, the direction in which the medium P is fed is referred to as "downstream", and the opposite direction is referred to as "upstream".

Scanner Outline

Hereinafter, the scanner 1 according to the present disclosure will be described with reference mainly to FIGS. 1 and 2.

Figure 2:
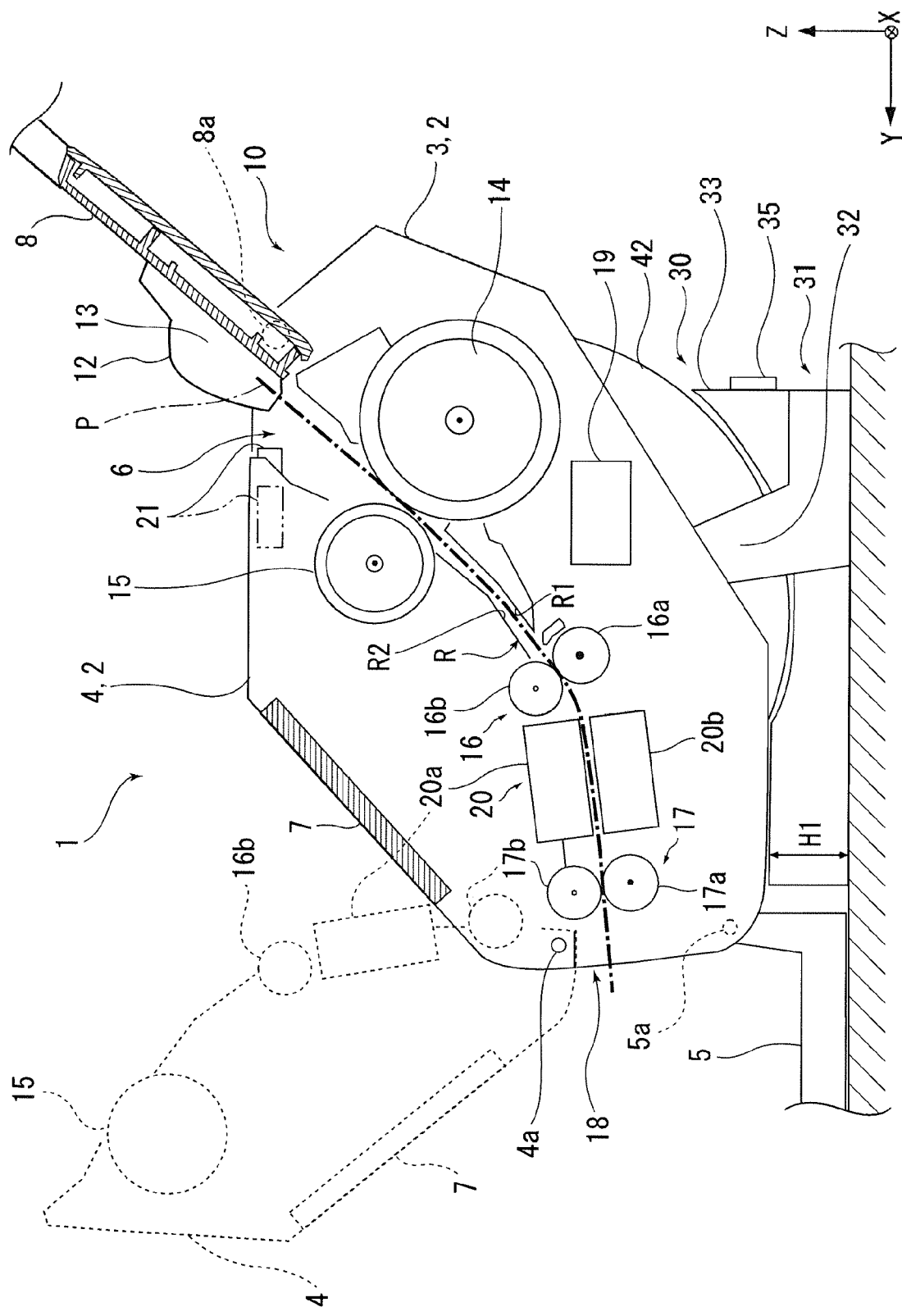
FIG. 2 is a side sectional view illustrating a medium transport path in the scanner.

The scanner 1 illustrated in FIG. 1 includes, as illustrated in FIG. 2, a reader 20 that reads a medium P transported on a medium transport path R from a supply unit 6, which supplies the medium P, to a discharge unit 18, which discharges the medium P.

The scanner 1 is configured to include a medium transport apparatus 10 that feeds the medium P toward the reader 20. In the present embodiment, an apparatus obtained by omitting the reading function by the reader 20 from the scanner 1 can be regarded as the medium transport apparatus 10.

The medium transport apparatus 10 includes an apparatus main body 2 having the medium transport path R illustrated in FIG. 2.

The apparatus main body 2 includes a lower unit 3 that forms a lower portion of the apparatus main body 2 and an upper unit 4 that, by pivoting with respect to a pivot shaft 4a provided on the discharge unit 18 side, is capable of switching between a closed state in which the upper unit 4 covers the lower unit 3 as illustrated by a solid line in FIG. 2 and an open state in which the lower unit 3 is exposed as illustrated by a dotted line in FIG. 2.

More specifically, as illustrated in FIG. 2, the lower unit 3 forms a lower path surface R1 of the medium transport path R, and the upper unit 4 in the closed state forms an upper path surface R2 of the medium transport path R. The upper unit 4 is pivoted to the front of the apparatus and is opened to expose the medium transport path R, so that maintenance of the inside of the apparatus main body 2 can be performed.

The medium transport path R will be described after the outline of the scanner 1 is described.

Furthermore, the apparatus main body 2 illustrated in FIG. 2 is configured to be capable of switching the attitude thereof with respect to the mounting surface G on which the apparatus main body 2 is mounted by a switcher 30 described later.

Figure 3:
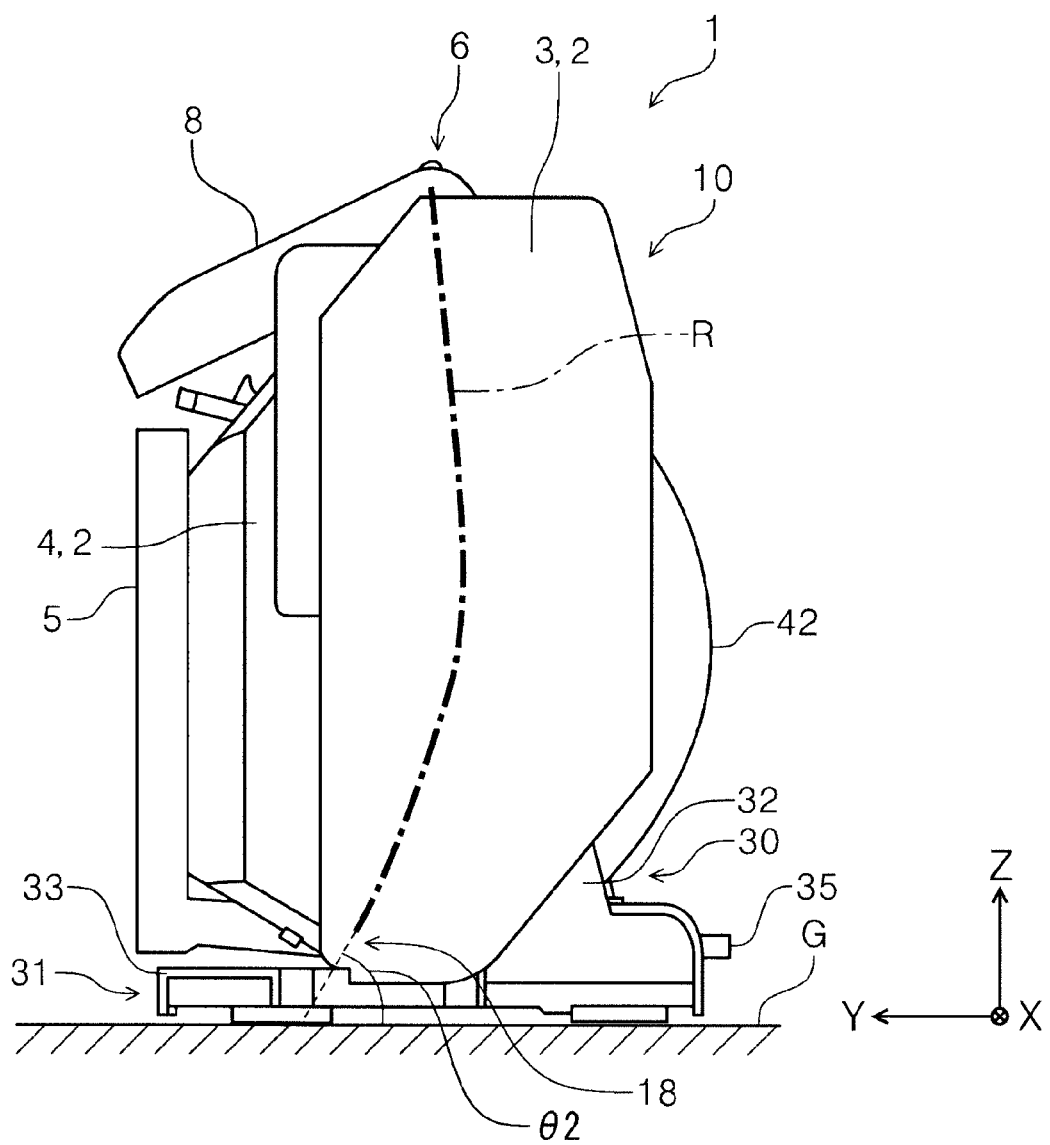
FIG. 3 is a side view illustrating the scanner when the apparatus main body is in the second attitude.
Figure 4:
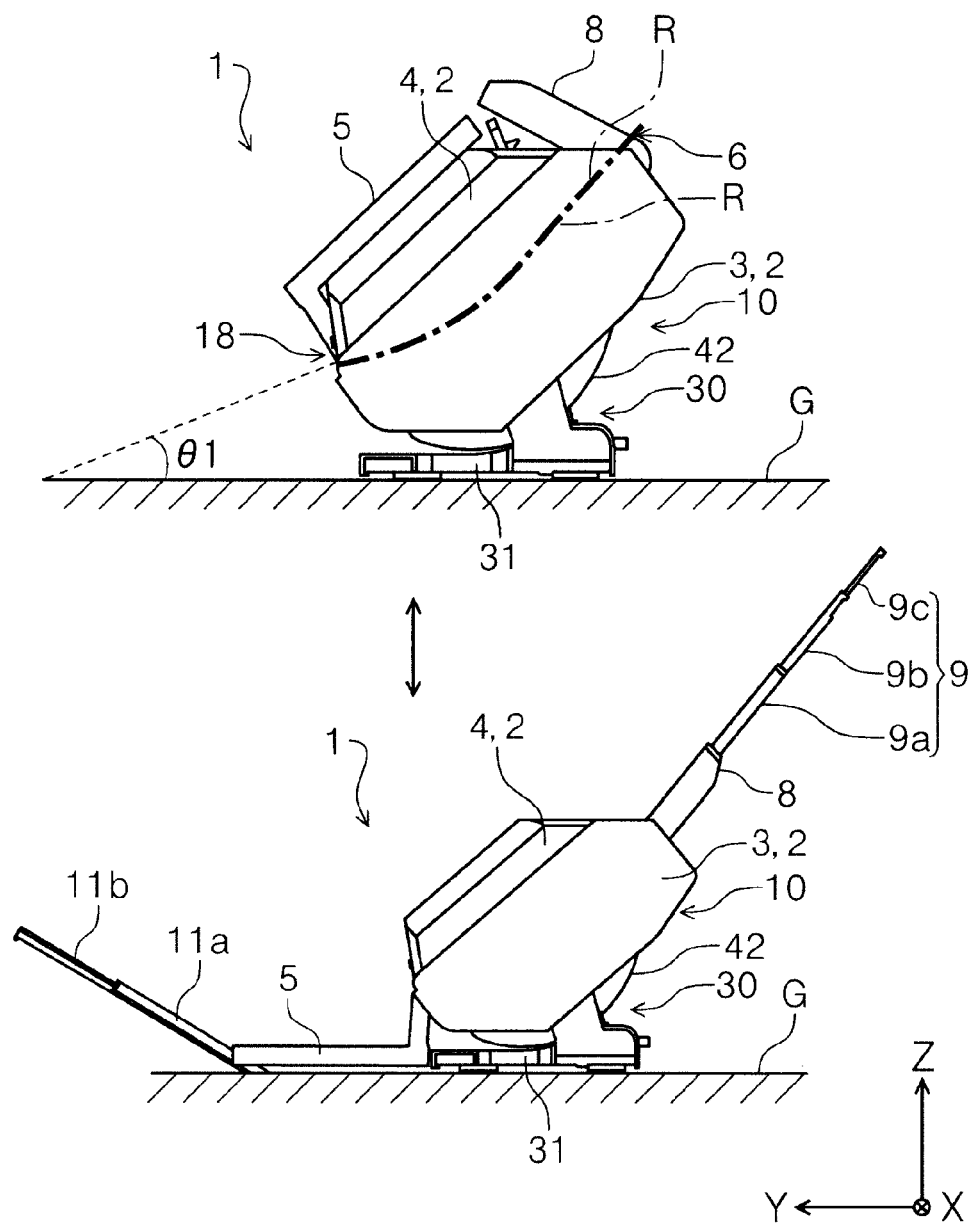
FIG. 4 is a side view illustrating the scanner when the apparatus main body is in a first attitude.
Figure 5:
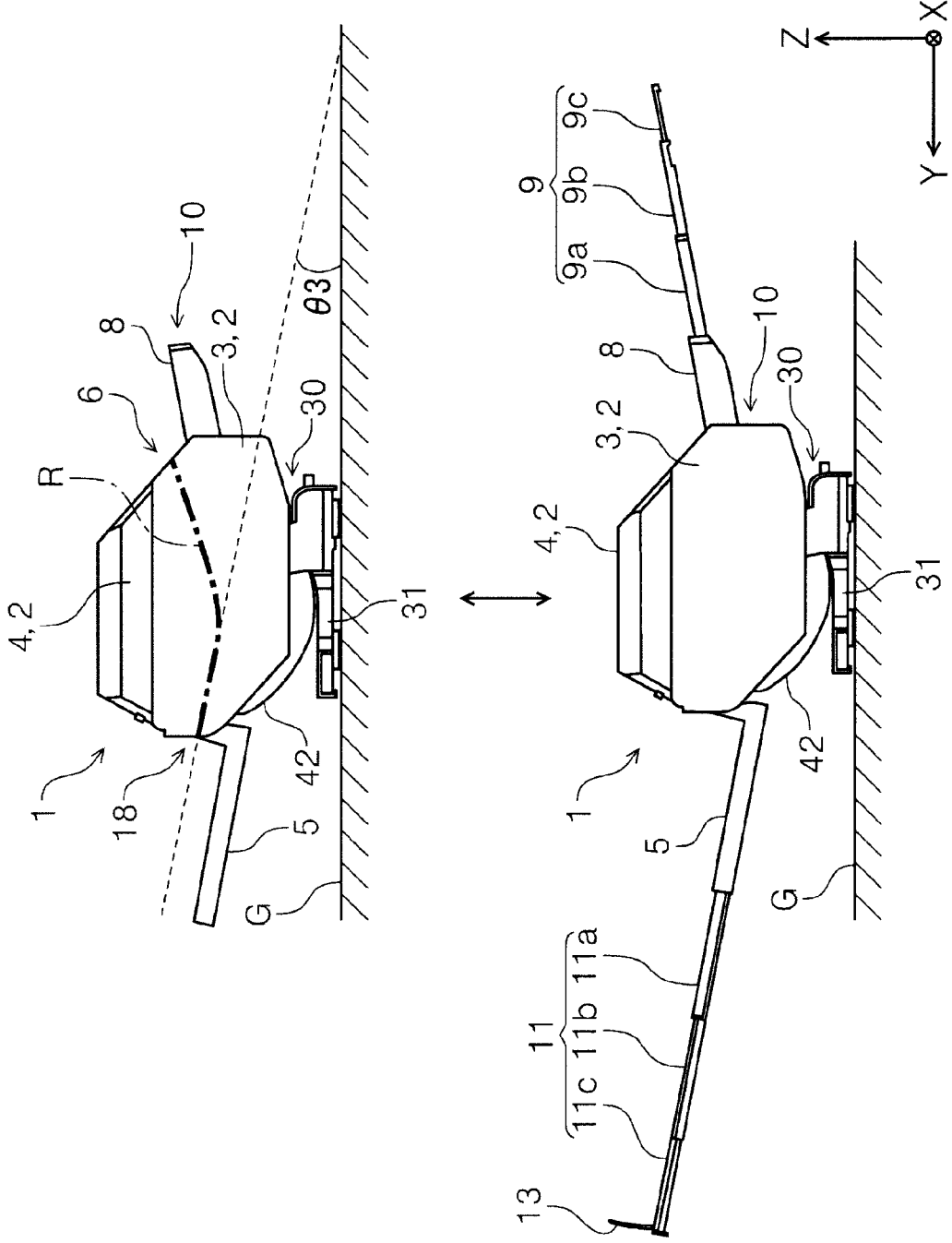
FIG. 5 is a side view illustrating the scanner when the apparatus main body is in a third attitude.
Figure 6:
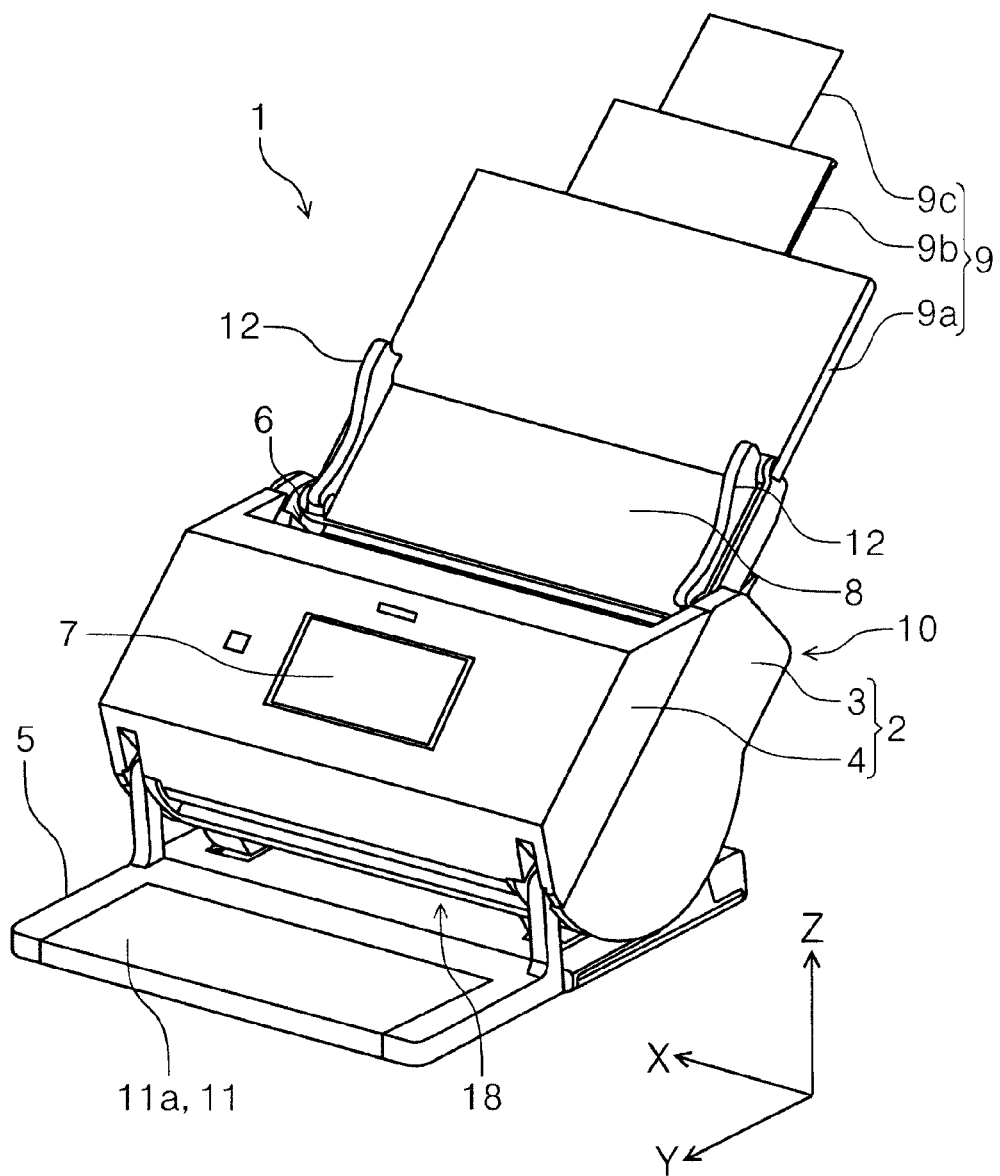
FIG. 6 is a perspective view illustrating the scanner when the apparatus main body is in the first attitude.
Figure 7:
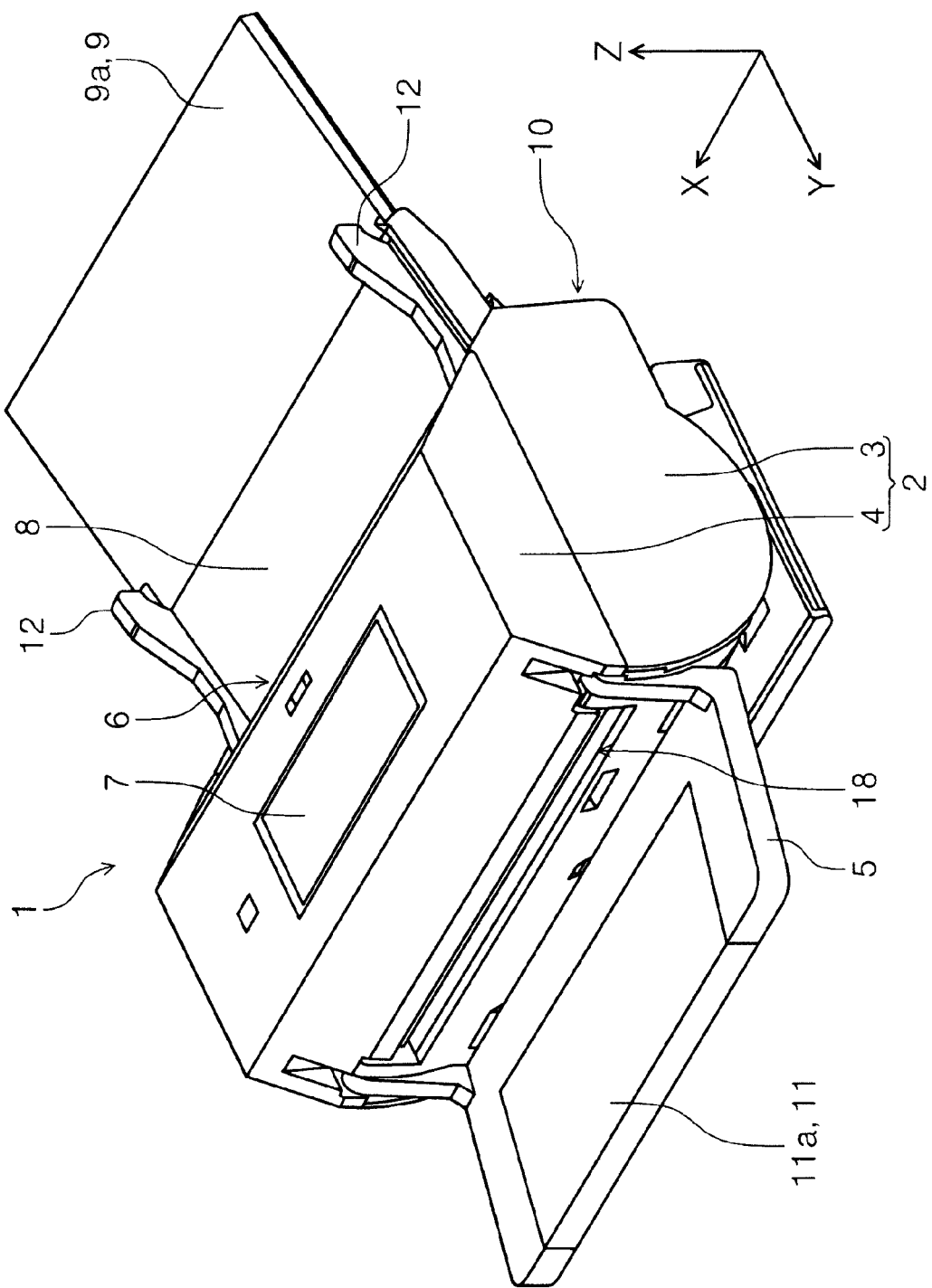
FIG. 7 is a perspective view illustrating the scanner when the apparatus main body is in the third attitude.

In the present embodiment, the switcher 30 is capable of switching the apparatus main body 2 between a first attitude illustrated in FIGS. 4 and 6, a second attitude illustrated in FIGS. 1 and 3, and a third attitude illustrated in FIGS. 5 and 7.

The first attitude of the apparatus main body 2 illustrated in FIGS. 4 and 6 is an attitude in which the discharge direction of the medium from the medium transport path R takes a first inclination angle $\theta 1$ with respect to the mounting surface G.

The second attitude of the apparatus main body 2 illustrated in FIGS. 1 and 3 is an attitude in which the discharge direction from the medium transport path R takes a second inclination angle $\theta 2$ that is closer to the vertical angle than is the first inclination angle $\theta 1$ with respect to the mounting surface G or is an attitude in which the discharge direction is vertical. In the present embodiment, the second inclination angle $\theta 2$ is an angle larger than the first inclination angle $\theta 1$. That is, $\theta 2 > \theta 1$.

The third attitude of the apparatus main body 2 illustrated in FIGS. 5 and 7 is an attitude in which the discharge direction takes a third inclination angle $\theta 3$ that is closer to the horizontal angle than is the first inclination angle $\theta 1$ with respect to the mounting surface G, or is an attitude in which the discharge direction becomes horizontal. In the present embodiment, the third inclination angle $\theta 3$ is an angle smaller than the first inclination angle $\theta 1$. That is, $\theta 1 > \theta 3$.

As illustrated in FIG. 3, because the second attitude of the apparatus main body 2 is an attitude in which the discharge direction from the medium transport path R takes a second inclination angle $\theta 2$ that is closer to the vertical angle than is the first inclination angle $\theta 1$ with respect to the mounting surface G, it becomes an attitude in which the apparatus main body 2 is made compact in the apparatus depth direction. Therefore, when the scanner 1 is stored when the apparatus is not used, the apparatus main body 2 may be set to the second attitude.

When the apparatus main body 2 is in the second attitude illustrated in FIG. 3, the discharge unit 18 is generally directed downward, so that dust, dirt and the like can be prevented from entering the discharge unit 18.

In the first attitude (FIGS. 4 and 6) or the third attitude (FIGS. 5 and 7) of the apparatus main body 2, because the discharge unit 18 faces the +Y direction more than in the second attitude, the medium P can be discharged from the discharge unit 18. Therefore, when the apparatus main body 2 is set to the first attitude or the third attitude, the medium P can be transported and scanned.

The specific configuration of the switcher 30 for switching the attitude of the apparatus main body 2 will be described in detail after the outline of the scanner 1 and the medium transport path R have been described.

In FIG. 1 and FIG. 2, a feed tray 8 is provided above the apparatus main body 2. The feed tray 8 of the present embodiment is provided so as to be pivotable with respect to a pivot shaft 8a (FIG. 2) provided in the apparatus main body 2, and as illustrated in FIG. 2, is configured to be capable of switching between a first state in which the feed tray 8 supports the medium P fed to the medium transport path R and a second state in which the feed tray 8 covers a portion of the apparatus main body 2.

The feed tray 8 is brought into the first state illustrated in FIG. 2 when the scanner 1 is to be used and supports the medium P, and is brought into the second state illustrated in FIG. 1 when the scanner 1 is not used and functions as a cover that covers the supply unit 6 of the apparatus main body 2. In addition, by folding the feed tray 8 when the scanner 1 is not in use, the scanner 1 can be made compact.

In addition, in FIGS. 1 and 2, a discharge tray 5 is provided below the apparatus main body 2. The discharge tray 5 of the present embodiment is provided so as to be pivotable with respect to a pivot shaft 5a (FIG. 2) provided in the apparatus main body 2, and, as illustrated in FIG. 2, is configured to be capable of switching between a third state in which the discharge tray 5 supports the medium P discharged from the medium transport path R and, as illustrated in FIG. 1, a fourth state in which the discharge tray 5 covers a portion of the apparatus main body 2.

The discharge tray 5 is brought into the third state illustrated in FIG. 2 when the scanner 1 is to be used and supports the medium P discharged from the discharge unit 18, and is brought into the fourth state illustrated in FIG. 1 when the scanner 1 is not used and functions as a cover that covers the apparatus main body 2. In addition, by folding the discharge tray 5 when the scanner 1 is not in use, the scanner 1 can be made compact.

As illustrated in FIG. 1, the feed tray 8 in the second state and the discharge tray 5 in the fourth state are configured so as not to cover the same portion of the apparatus main body 2. As a result, as illustrated in FIG. 1, when both the feed tray 8 and the discharge tray 5 are closed with respect to the apparatus main body 2, an increase in the size of the feed tray 8 and the discharge tray 5 in the thickness direction can be suppressed.

In addition, as illustrated in FIGS. 6 and 7, the feed tray 8 is provided with a pair of left and right edge guides 12, 12 that guide side edges of the medium P in the width direction (X-axis direction) intersecting the medium transport direction.

The edge guides 12 are provided so as to be slidable in the X-axis direction in accordance with the size of the medium P. In the present embodiment, the edge guides 12, 12 are configured such that, following the movement in the X direction of the edge guide 12 on the +X side by a known rack and pinion mechanism, the edge guide 12 on the −X side moves in the opposite direction.

In the feed tray 8, the medium P is aligned at the center in the width direction and is configured to be fed by a so-called center sheet feeding method by a feed roller 14 described later provided in a center region in the width direction.

In addition, the feed tray 8, by way of example, as illustrated in the lower diagram of FIG. 4 and FIG. 6, includes an auxiliary feed tray 9 that is capable of switching between a first advanced state in which the auxiliary feed tray 9 is advanced to a free end with respect to the feed tray 8 and, as illustrated in FIG. 1, a first storage state in which the auxiliary feed tray 9 is stored in the feed tray 8. The auxiliary feed tray 9 is formed of a three-stage tray including a first auxiliary feed tray 9a, a second auxiliary feed tray 9b, and a third auxiliary feed tray 9c. By setting the auxiliary feed tray 9 in the first advanced state illustrated in the lower diagram of FIG. 4 and FIG. 6, the length of the feed tray 8 can be extended. Thus, the medium P can be more reliably supported by the feed tray 8. In addition, when the scanner 1 is not in use, the apparatus can be made compact by putting the auxiliary feed tray 9 in the first storage state.

In addition, the discharge tray 5 is, for example, as illustrated in the lower part of FIG. 5, provided with an auxiliary discharge tray 11 that is capable of switching between a second advanced state in which the auxiliary discharge tray 11 is advanced to a free end side with respect to the discharge tray 5 and a second storage state in which the auxiliary discharge tray 11 is stored in the discharge tray 5. The auxiliary discharge tray 11 is formed of a three-stage tray including a first auxiliary discharge tray 11a, a second auxiliary discharge tray 11b, and a third auxiliary discharge tray 11c. At the tip of the third auxiliary discharge tray 11c, a restricting portion 13 which is formed so as to be foldable with respect to the third auxiliary discharge tray 11c and which restricts the movement of the set medium P in the +Y direction is provided. By setting the auxiliary discharge tray 11 in the second advanced state illustrated in the lower diagram of FIG. 5, the length of the auxiliary discharge tray 11 can be extended. Thus, the medium P can be more reliably supported by the discharge tray 5. In addition, when the scanner 1 is not in use, the apparatus can be made compact by putting the auxiliary discharge tray 11 in the second storage state.

In addition, as illustrated in FIGS. 6 and 7, the upper unit 4 is provided with an operation panel 7 as a "displayer" that displays content related to the apparatus operation such as the reading setting content. The operation panel 7 can be configured, for example, as a touch panel and enables a user to perform operations such as various settings, reading execution, and the like, in addition to display of content related to apparatus operation.

In addition, in FIG. 2, the apparatus main body 2 is provided with a controller 19 that executes various controls in the scanner 1. The control by the controller 19 will be described in detail later.

Medium Transport Path

The medium transport path R in the medium transport apparatus 10 will be described below mainly with reference to FIG. 2. In FIG. 2, the apparatus main body 2 is in the first attitude.

In the medium transport path R where the medium P is supplied from the feed tray 8, the feed roller 14, a separation roller 15, a first transport roller pair 16, the reader 20, and a second transport roller pair 17 are arranged in order from the upstream in the medium transport direction.

The first transport roller pair 16 is formed of a first drive roller 16a and a first driven roller 16b. The second transport roller pair 17 is formed of a second drive roller 17a and a second driven roller 17b.

The feed roller 14, the first drive roller 16a, and the second drive roller 17a are provided so as to be pivotable with respect to the lower unit 3. In addition, the separation roller 15 provided at a position facing the feed roller 14, the first driven roller 16b, and the second driven roller 17b are provided so as to be pivotable with respect to the upper unit 4.

The medium P set on the feed tray 8 is picked up by the feed roller 14 and sent toward the first transport roller pair 16. Specifically, the medium P is fed downstream by the feed roller 14 rotating while being in contact with the surface of the medium P that faces the feed tray 8. Therefore, when a plurality of media P are set on the feed tray 8 of the scanner 1, the media P on the lower side are sequentially fed downstream.

At a position facing the feed roller 14 in FIG. 2, the separation roller 15, which nips the medium P between the separation roller 15 and the feed roller 14 to separate the medium P, is provided.

The first transport roller pair 16 transports the medium P fed by the feed roller 14 toward the reader 20. Similarly, to the feed roller 14, the first transport roller pair 16 is also provided in the center region in the X-axis direction, which is the width direction.

The reader 20 includes a first reading unit 20a provided on the upper unit 4 side and a second reading unit 20b provided on the lower unit 3 side. In the present embodiment, the first reading unit 20a and the second reading unit 20b are formed as a contact image sensor module (CISM) as an example.

The first reading unit 20a reads the surface of the medium P that faces upward, and the second reading unit 20b reads the opposite surface of the medium P, that is, the surface of the medium P that faces downward.

The medium P, after being read by the reader 20 on at least one side, is nipped by the second transport roller pair 17 located downstream of the reader 20 and is discharged from the discharge unit 18 provided on the apparatus front side of the lower unit 3.

In the present embodiment, the feed roller 14, the separation roller 15, the first drive roller 16a, and the second drive roller 17a are rotationally driven by a drive source (not illustrated). Instead of a configuration in which the rollers are all driven by the same drive source, a configuration may be employed in which the rollers are driven by two or more drive sources.

In this embodiment, as an example, the separation roller 15, the first drive roller 16a, and the second drive roller 17a are driven by a common drive source, and the feed roller 14 is driven by another drive source.

Switcher

Next, the switcher 30 that switches the attitude of the apparatus main body 2 with respect to the mounting surface G on which the apparatus main body 2 is mounted will be described.

Figure 8:
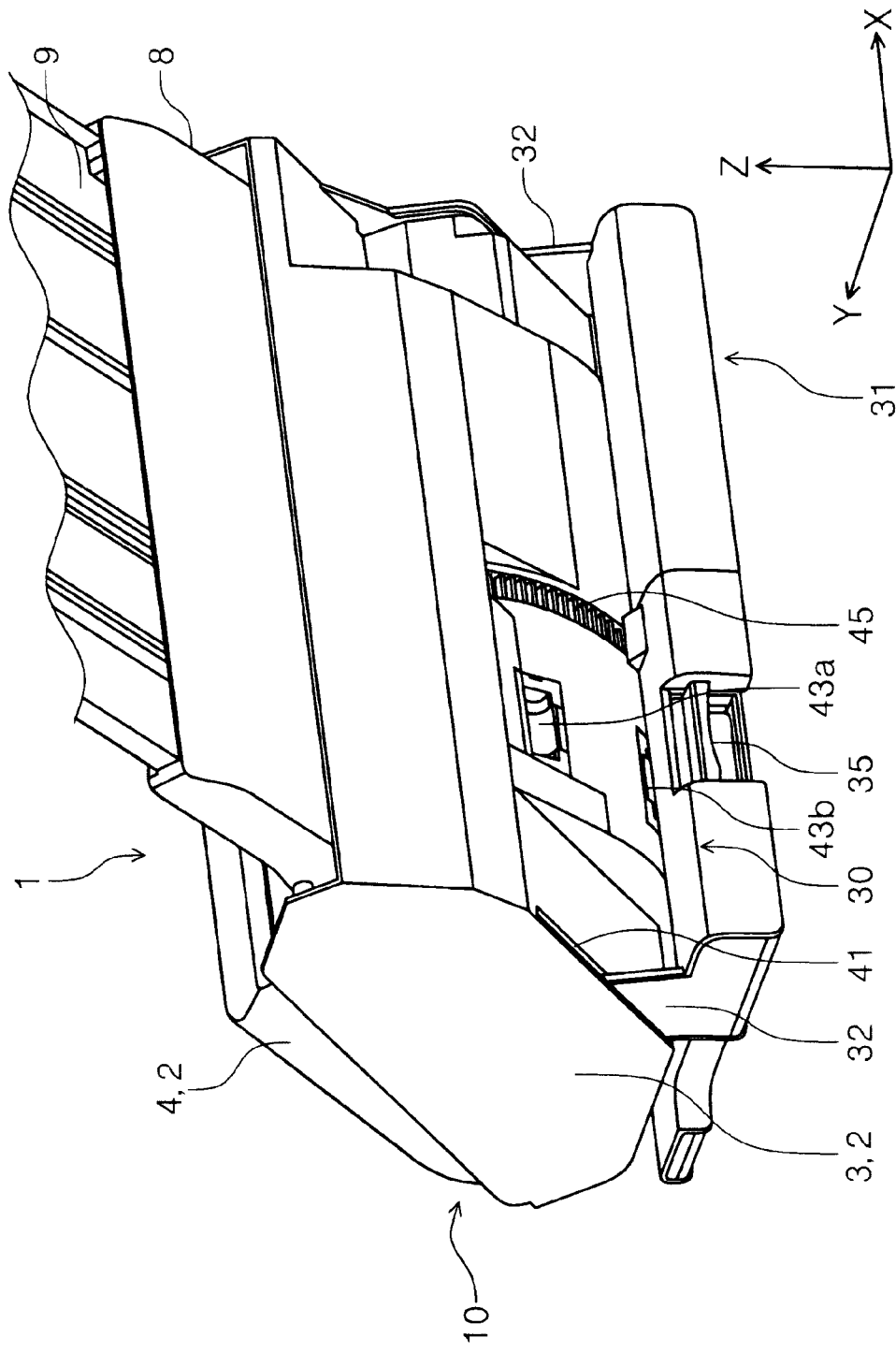
FIG. 8 is a perspective view of the scanner viewed from the rear side.
Figure 9:
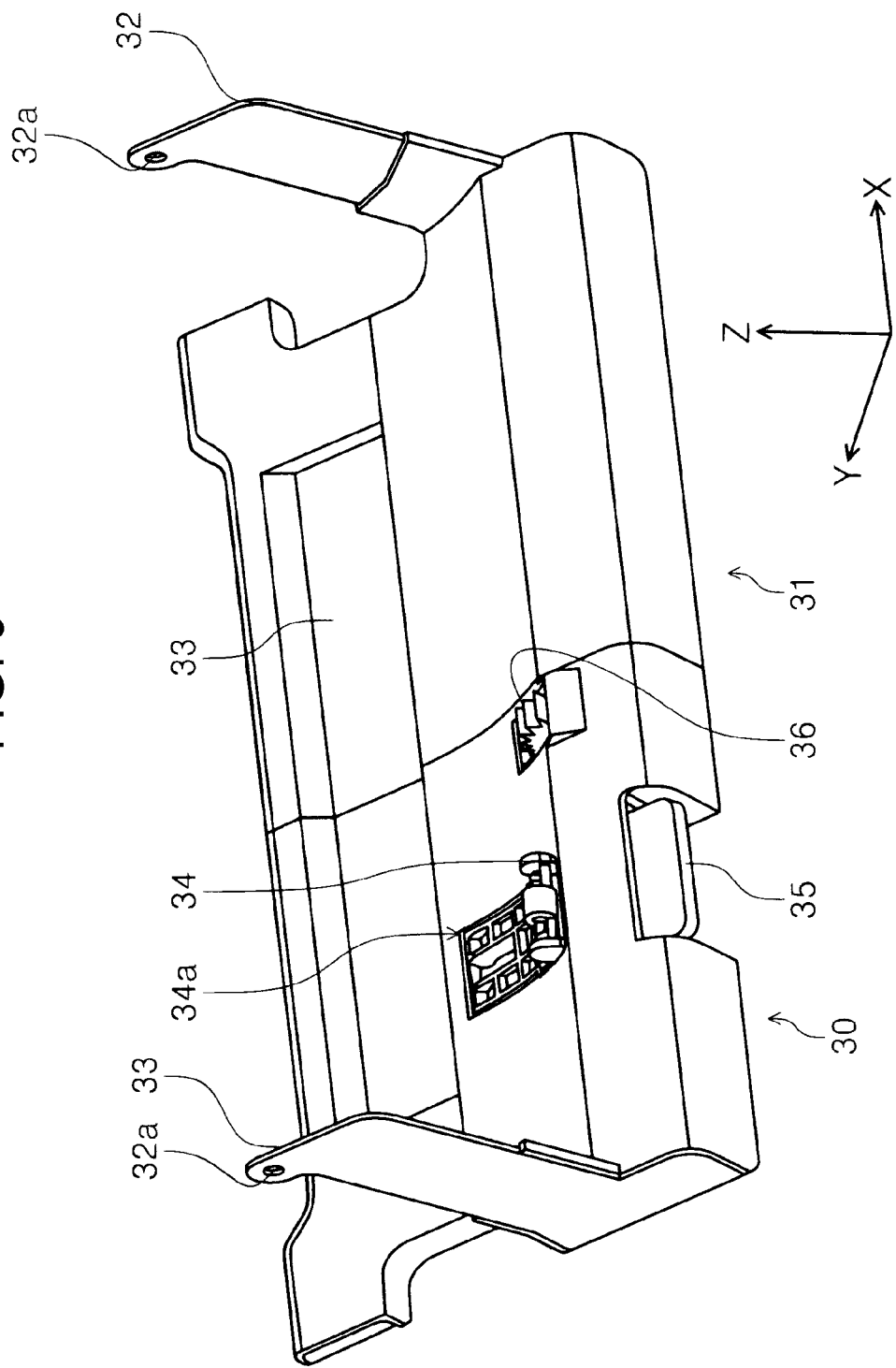
FIG. 9 is a perspective view illustrating a main body support member.

In the present embodiment, the apparatus main body 2 is supported by a main body support member 31 illustrated in FIG. 9 and the switcher 30 is configured to switch the attitude of the apparatus main body 2 by changing the support position of the apparatus main body 2 supported by the main body support member 31. The switcher 30 will be described in more detail with reference mainly to FIGS. 8 to 11.

Figure 10:
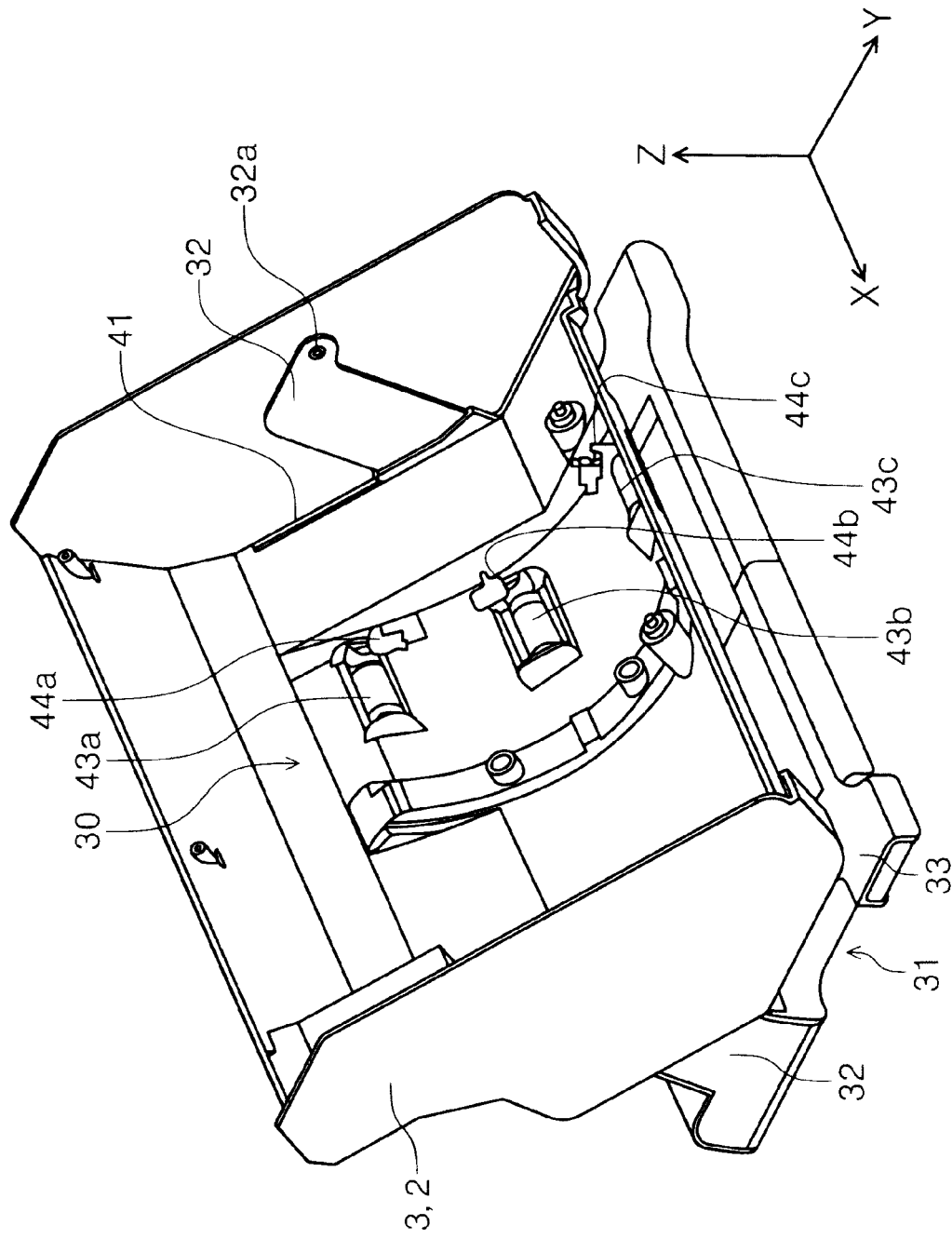
FIG. 10 is a perspective view illustrating the inside of a lower unit.

The main body support member 31 illustrated in FIG. 9 includes a base portion 33 on which the lower unit 3 of the apparatus main body 2 is mounted, and support portions 32, 32 provided on both sides of the base portion 33 in the width direction. As illustrated in FIG. 10, the support portions 32, 32 are inserted from slits 41 provided in the lower unit 3, and pivot shaft portions 32a, 32a are attached to the inside of the lower unit 3. The lower unit 3 pivots with respect to the pivot shaft portions 32a, 32a.

Figure 11:
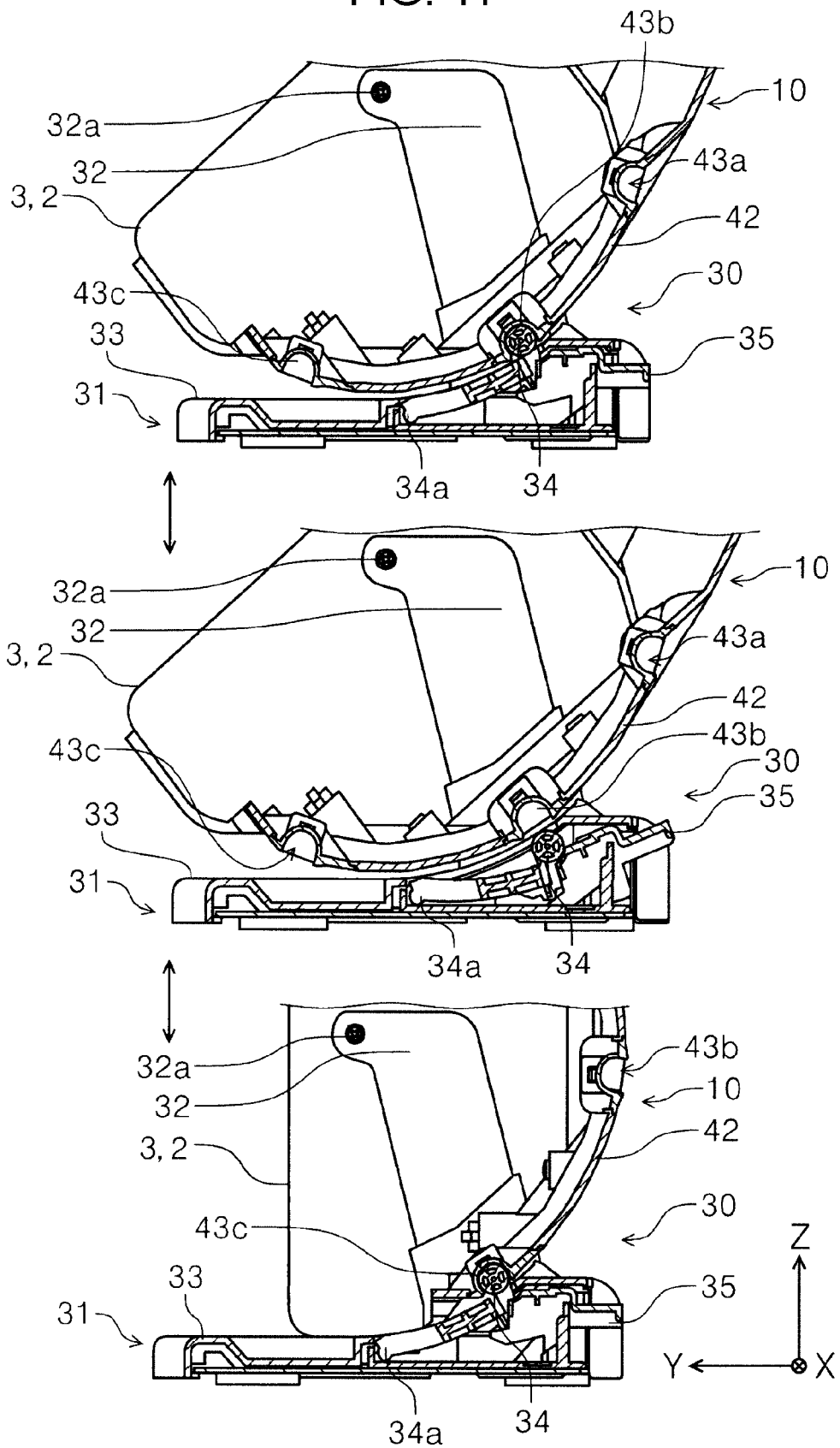
FIG. 11 is a side sectional view for explaining switching of the attitude of the apparatus main body.

A bottom portion 42 of the lower unit 3 is formed in an arc shape in side section as illustrated in each drawing of FIG. 11. The bottom portion 42 is provided with a first recessed portion 43b, a second recessed portion 43c, and a third recessed portion 43a, as illustrated in the upper view of FIG. 11.

A rack 45 is provided along the arc at the bottom portion 42 of the lower unit 3 illustrated in FIG. 8. In addition, a pinion 36 is provided on the base portion 33 of the main body support member 31 illustrated in FIG. 9. The pinion 36 meshes with the rack 45 and rotates when the lower unit 3 pivots with respect to the pivot shaft portions 32a, 32a. Thereby, stable pivoting of the lower unit 3 can be realized.

The main body support member 31 illustrated in FIG. 9 is provided with an engagement portion 34 engageable with the first recessed portion 43b, the second recessed portion 43c, and the third recessed portion 43a. The engagement portion 34 is a "fixer" that fixes the main body support member 31 and the lower unit 3 as the apparatus main body 2. The engagement portion 34 swings in advancing and retracting directions with respect to the base portion 33. A swing shaft 34a of the engagement portion 34 is provided on the +Y side. In the present embodiment, the engagement portion 34 is formed of a roller.

When the engagement portion 34 engages with the first recessed portion 43b, the apparatus main body 2 is in the first attitude illustrated in the upper diagram of FIG. 4, when the engagement portion 34 engages with the second recessed portion 43c, the apparatus main body 2 is in the second attitude illustrated in FIG. 3, and when the engagement portion 34 engages with the third recessed portion 43a, the apparatus main body 2 is in the third attitude illustrated in the upper diagram of FIG. 5.

Because the engagement portion 34 engages with the first recessed portion 43b, the second recessed portion 43c, and the third recessed portion 43a corresponding to respective attitudes, the attitude of the apparatus main body 2 can be maintained by fixing the main body support member 31 and the apparatus main body 2.

The upper diagram of FIG. 11 and the lower diagram of FIG. 11 illustrate the state in which the engagement portion 34 has been advanced from the base portion 33, and the middle diagram of FIG. 11 illustrates the state in which the engagement portion 34 has been retracted.

The engagement portion 34 is pressed in the advancing direction with respect to the base portion 33 by a pressing member (not illustrated). A lever member 35 as an "operation restrictor" is attached to the engagement portion 34, and by lifting the lever member 35 against the pressing force, the engagement portion 34 becomes in the retracted state illustrated in the middle diagram of FIG. 11, and it becomes possible to pivot the lower unit 3. That is, the operation of the switcher 30 is permitted.

On the other hand, when the force to lift the lever member 35 is released, the engagement portion 34 returns to the state in which it is pushed in the advancing direction toward the base portion 33, and when the engagement portion 34 engages with any of the first recessed portion 43b, the second recessed portion 43c, and the third recessed portion 43a, the operation of the switcher 30 is restricted. In the present embodiment, the lever member 35 is configured to be capable of switching between the restricting state and the permitting state under the control of the controller 19.

Moreover, the upper diagram of FIG. 11 illustrates a state in which the lever member 35 is in the restricting state, the engagement portion 34 is engaged with the first recessed portion 43b, and the apparatus main body 2 is fixed in the first attitude; the middle diagram of FIG. 11 illustrates a state in which the lever member 35 is in the permitting state and the engagement portion 34 is not engaged with the first recessed portion 43b or the second recessed portion 43c; and the lower diagram of FIG. 11 illustrates a state in which the lever member 35 is in the restricting state, the engagement portion 34 is engaged with the second recessed portion 43c, and the apparatus main body 2 is fixed in the second attitude.

It is possible to easily switch the apparatus main body 2 to a predetermined attitude by the switcher 30 formed as described above.

At positions corresponding to the first recessed portion 43b, the second recessed portion 43c, and the third recessed portion 43a inside the lower unit 3 illustrated in FIG. 10, a first detection unit 44b, a second detection unit 44c, and a third detection unit 44a are provided. The first detection unit 44b, the second detection unit 44c, and the third detection unit 44a are configured to be capable of detecting that the engagement portion 34 is engaged with the corresponding ones of the first recessed portion 43b, the second recessed portion 43c, and the third recessed portion 43a, and so as to detect the attitude of the apparatus main body 2 on the basis of the detection results of the first detection unit 44b, the second detection unit 44c, and the third detection unit 44a.

Moreover, because FIG. 10 is a perspective view of the lower unit 3 as seen from the inside of the apparatus, although portions in FIG. 10 denoted by reference signs 43b, 43c and 43a correspond to the rear sides of the first recessed portion 43b, the second recessed portion 43c and the third recessed portion 43a and are not strictly recessed portions, suppose that the portions denoted by reference signs 43b, 43c and 43a illustrate the positions corresponding to the first recessed portion 43b, the second recessed portion 43c, and the third recessed portion 43a.

Control by Controller

Subsequently, control by the controller 19 will be described.

In the present embodiment, the controller 19, as illustrated in FIGS. 3 to 5, when the attitude of the apparatus main body 2 with respect to the mounting surface G is switched, is configured to perform control in accordance with the attitude after the switching.

The attitude of the apparatus main body 2 with respect to the mounting surface G is changed in accordance with the installation environment and the use situation. Functions convenient for the user may differ depending on the attitude of the apparatus main body 2. Therefore, the controller 19 can perform an appropriate operation in accordance with the attitude of the apparatus main body 2 by performing control according to the attitude of the apparatus main body 2 after the switching. Therefore, the usability of the scanner 1 by the user is improved.

Hereinafter, specific control by the controller 19 will be described.

For example, the controller 19 can be configured to turn off the apparatus power when the apparatus main body 2 is switched to the second attitude illustrated in FIGS. 1 and 3.

The second attitude of the apparatus main body 2 is an attitude in which the apparatus main body 2 can be mounted on the mounting surface G in a space-saving manner and is an attitude suitable for storage when the scanner 1 is not being used.

Therefore, in the case where the apparatus main body 2 is switched to the second attitude, the power of the apparatus can be automatically turned off by the controller 19 turning off the apparatus power when the scanner 1 is not to be used and is to be stored.

Figure 14:
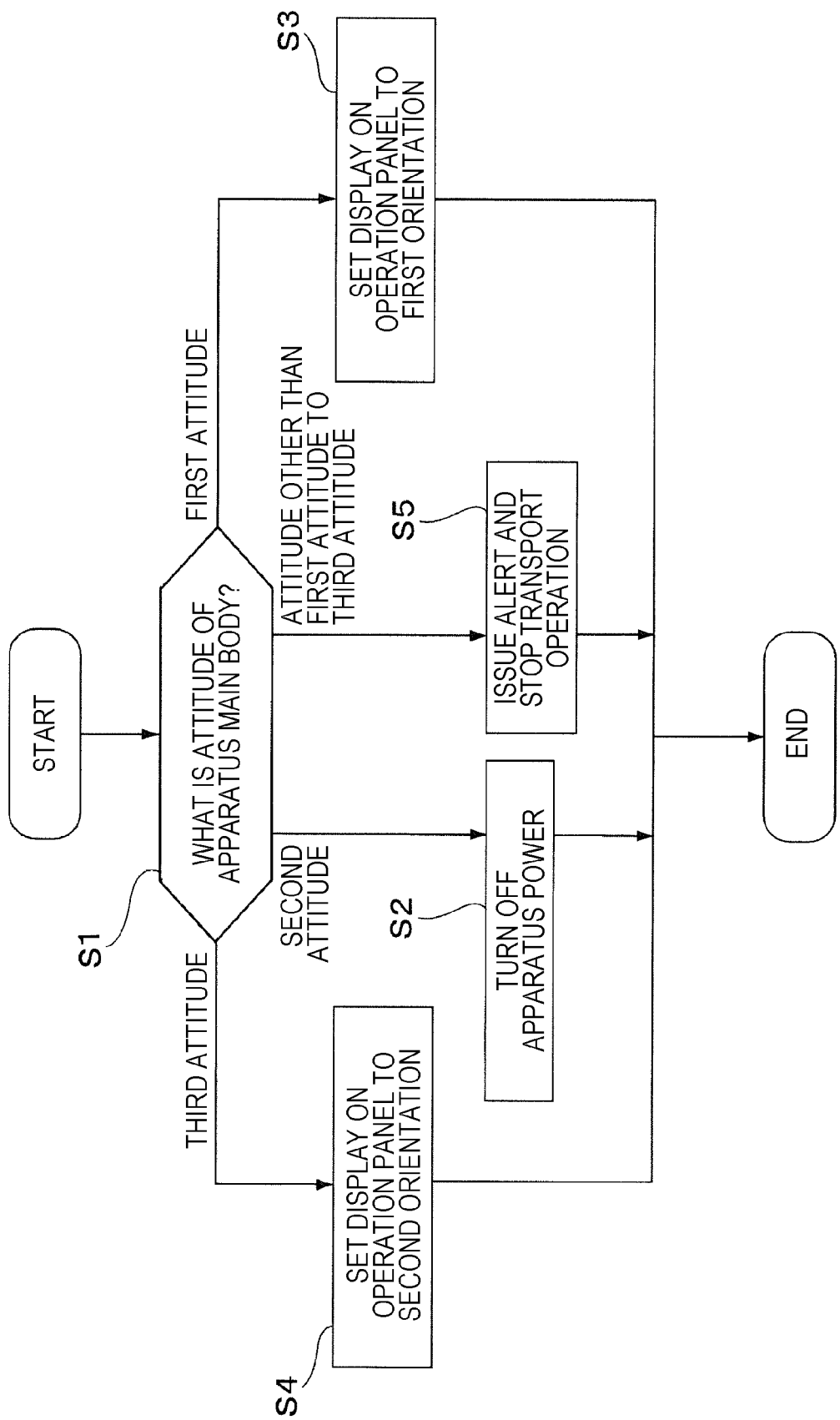
FIG. 14 is a flowchart illustrating control performed by the controller.

FIG. 14 illustrates a flowchart of control by the controller 19. The controller 19 determines to which state the attitude of the apparatus main body 2 has been switched in step S1. Moreover, the attitude of the apparatus main body 2 can be determined on the basis of the detection results of the first detection unit 44*b*, the second detection unit 44*c*, and the third detection unit 44*a* illustrated in FIG. 10, as described above.

The apparatus main body 2 is in the first attitude when the first detection unit 44*b* is in the detection state, is in the second attitude when the second detection unit 44*c* is in the detection state, and is in the third attitude when the third detection unit 44*a* is in the detection state. When none of the first detection unit 44*b*, the second detection unit 44*c*, and the third detection unit 44*a* are in the detection state, it can be said that the apparatus main body 2 is not in any of the first attitude, the second attitude, and the third attitude and is in the middle of switching.

If it is determined in step S1 that the apparatus main body 2 has been switched to the second attitude, the process proceeds to step S2, and the apparatus power is turned off.

Figure 13:
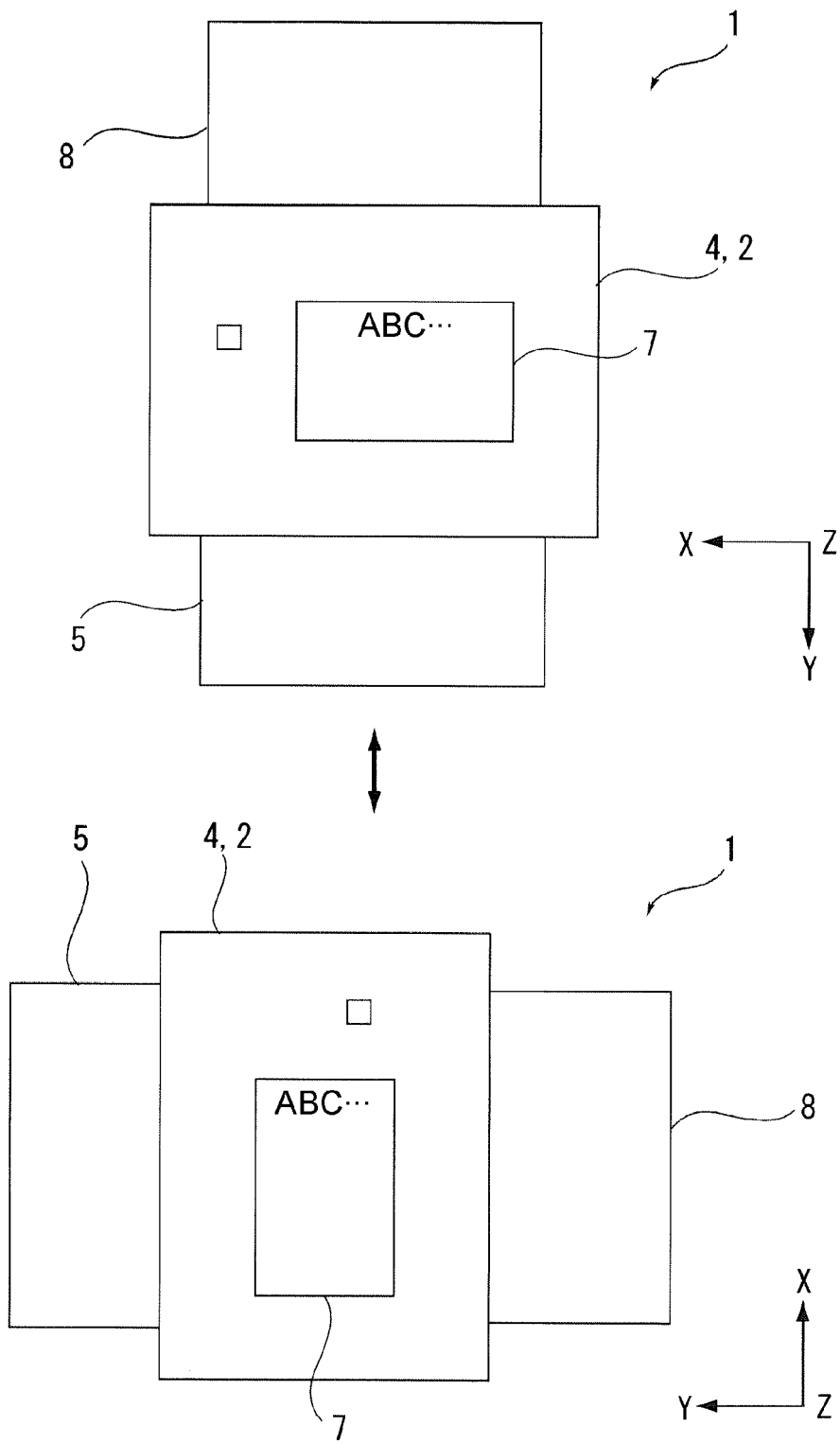
FIG. 13 is a diagram for explaining switching of a display direction of an operation panel performed by a controller.

In addition, when the apparatus main body 2 is in the first attitude illustrated in FIGS. 4 and 6, the controller 19 sets the display on the operation panel 7 to a first orientation in which the display can be read, in plan view of the apparatus main body 2, with downstream down and upstream up in the discharge direction as illustrated in the upper diagram of FIG. 13. When the apparatus main body 2 is in the third attitude illustrated in FIGS. 5 and 7, the controller 19 sets the display on the operation panel 7 to a second orientation rotated 90° counterclockwise from the first orientation, as illustrated in the lower diagram of FIG. 13.

That is, if it is determined in step S1 of the flowchart illustrated in FIG. 14 that the apparatus main body 2 has been switched to the first attitude, the display on the operation panel 7 is set to the first orientation in step S3. In addition, if it is determined in step S1 that the apparatus main body 2 has been switched to the third attitude, the display on the operation panel 7 is set to the second orientation in step S4.

In the scanner 1, when the apparatus main body 2 is set to the first attitude illustrated in FIGS. 4 and 6, the user often performs operations facing toward the apparatus main body 2 such that downstream in the discharge direction faces toward the user and upstream faces away from the user. On the other hand, when the apparatus main body 2 is set to the third attitude illustrated in FIGS. 5 and 7, it is assumed that the user operates the apparatus main body 2 so that the direction along the discharge direction becomes the left-right direction.

Therefore, by the controller 19 setting the display on the operation panel 7 to be in the first orientation illustrated in the upper diagram of FIG. 13 when the apparatus main body 2 is in the first attitude, and setting the display on the operation panel 7 to be in the second orientation illustrated in the lower diagram of FIG. 13 when the apparatus main body 2 is in the third attitude, the display on the operation panel 7 can be oriented in such a way that the user can easily view the display in each attitude. Moreover, the display when the apparatus main body 2 is in the third attitude can also be rotated clockwise from the first orientation.

In addition, when the apparatus main body 2 is in an attitude other than the first attitude or the third attitude, the controller 19 issues an alert and stops the transport operation in the apparatus main body 2.

That is, in step S1 of the flowchart illustrated in FIG. 14, when the attitude of the apparatus main body 2 is not any of the first attitude, the second attitude, and the third attitude, the transport operation in the apparatus main body 2 is stopped (step S5). Specifically, the controller 19 stops the transport operation when the attitude of the apparatus main body 2 is switched to none of the first attitude, the second attitude, and the third attitude during the transport operation. In addition, when the attitude of the apparatus main body 2 is not any of the first attitude, the second attitude, and the third attitude, the controller 19 may prohibit the transport operation by not accepting a transport operation request from the user.

As a result, it is possible to avoid the possibility that the transport operation is performed in a state other than the first attitude or the third attitude, for example, in the middle of attitude switching. In addition, the possibility that the transport operation is performed in the second attitude can be avoided.

The controller 19 stops the drive source (not illustrated) that drives the feed roller 14, the separation roller 15, the first drive roller 16*a*, and the second drive roller 17*a* described above, and stops the transport operation in the apparatus main body 2.

The alert can be configured to be generated, for example, by displaying a display giving notification of an error on the operation panel 7 or can be configured to activate an alert lamp or an alert sound.

In addition, the controller 19 puts the lever member 35 in a restricting state in which the switching operation of the switcher 30 is restricted during medium transport in the apparatus main body 2. By this, it is possible to suppress or avoid the possibility that attitude change of the apparatus main body 2 is performed during medium transport.

In addition, the controller 19 stops the transport operation when the switcher 30 moves during medium transport in the apparatus main body 2. If the switcher 30 moves due to any cause during medium transport in the scanner 1 and the attitude of the apparatus main body 2 changes, reading of the medium P by the reader 20 may not be properly performed.

The controller 19 stops the transport operation if the switcher 30 moves during medium transport in the apparatus main body 2, and thus the transport operation can be stopped when an operation to change the attitude of the apparatus main body 2 is performed during medium transport. Thus, it is possible to prevent reading of the medium P from being performed in an inappropriate state.

In addition, as illustrated in FIG. 3, the apparatus main body 2 is configured such that the discharge unit 18 faces downward in the second attitude. As described above, the upper unit 4 constituting the apparatus main body 2 can be switched between an open state with respect to the lower unit 3 as indicated by a dotted line in FIG. 2 and a closed state with respect to the lower unit 3 as indicated by a solid line in FIG. 2.

Here, the apparatus main body 2 is provided with a pivot restrictor 21 illustrated in FIG. 2. The pivot restrictor 21, under control of the controller 19, is configured to be capable of switching between a pivot restricting state in which pivoting of the upper unit 4 from the closed state to the open state is restricted and a pivot permitting state in which pivoting of the upper unit 4 from the closed state to the open state is permitted.

In the present embodiment, as one example, in the pivot restricting state, the pivot restrictor 21 is configured to protrude from the upper unit 4 toward the lower unit 3 as illustrated by a solid line in FIG. 2 to lock the closed state of the upper unit 4. In addition, in the pivot permitting state, the pivot restrictor 21 is configured to retract to the upper unit 4 side as indicated by a two-dot chain line in FIG. 2 and release the lock of the upper unit 4 in the closed state.

Then, when the apparatus main body 2 is set to an attitude other than the second attitude illustrated in FIG. 3, the controller 19 puts the pivot restrictor 21 into the pivot restricting state.

As in this embodiment, when the apparatus main body 2 includes the lower unit 3 and the upper unit 4 that opens and closes with respect to the lower unit 3 with the pivot shaft 4a on the discharge unit 18 side as an axis, and is configured such that the discharge unit 18 faces downward when the apparatus main body 2 is in the second attitude illustrated in FIG. 3, for example, if the lower unit is open when the apparatus main body 2 is in the first attitude (FIG. 2) instead of the second attitude, the lower unit 3 closes by its own weight due to a hand hitting it or the like, and this impact may cause damage to the upper unit 4 and the lower unit 3 as the apparatus main body 2 or to components inside the apparatus main body 2. The same possibility exists in the case where the apparatus main body 2 is in the third attitude (FIG. 5).

In the case where the apparatus main body 2 is in an attitude other than the second attitude illustrated in FIG. 3, the controller 19 can suppress the upper unit 4 from opening by putting the pivot restrictor 21 in the pivot restricting state when the apparatus main body 2 is in an attitude other than the second attitude. As a result, it is possible to reduce the possibility of the upper unit 4 being inadvertently closed and damage being applied to the apparatus main body 2 and components inside the apparatus main body 2.

Another Configuration of Medium Transport Apparatus

Hereinafter, another configuration of the medium transport apparatus 10 will be described.

Figure 12:
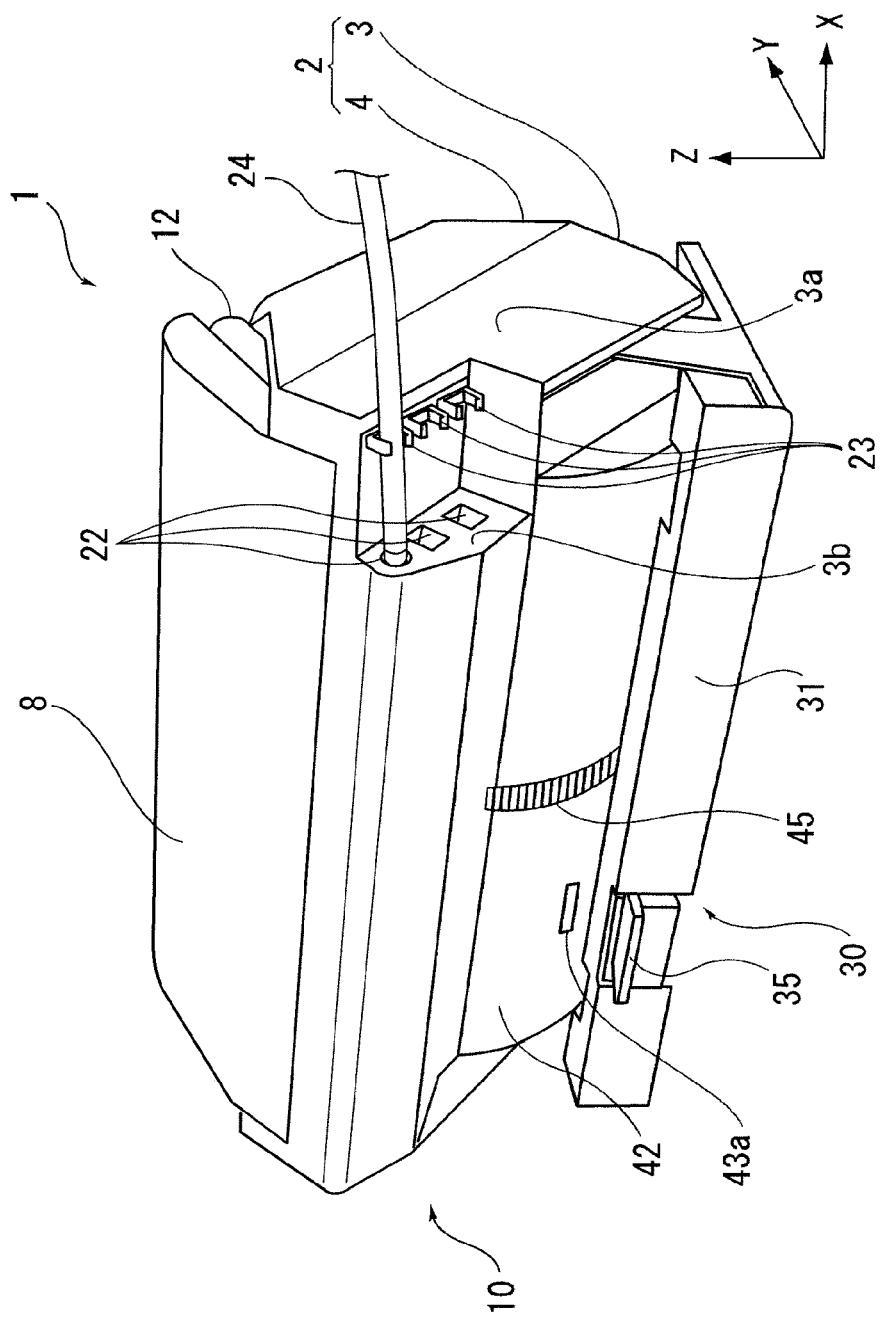
FIG. 12 is a perspective view illustrating a connection portion of a cable.

As illustrated in FIG. 12, in the medium transport apparatus 10, the apparatus main body 2 is provided with a connection portion 22 to which a cable 24 is coupled. Examples of the cable 24 coupled to the apparatus main body 2 include a cable for connection with another apparatus such as a personal computer and a power supply cable. The connection portion 22 is disposed so as to enable insertion and removal of the cable 24 regardless of the attitude of the apparatus main body 2.

In the present embodiment, the connection portion 22 is provided on the −Y side, which is to the rear of the lower unit 3. The lower unit 3 includes a rear side surface 3b at a position one step lower than a side surface 3a on the +X side. In the present embodiment, the connection portion 22 is provided on the rear side surface 3b.

By arranging the connection portion 22 in this manner, the cable 24 can be easily inserted into and removed from the connection portion 22 regardless of the attitude of the apparatus main body 2. Instead, the connection portion 22, for example, can also be provided on the side surface 3a.

A cable guide 23 is provided at a position away from the connection portion 22 in the +X direction. The cable 24 can be guided in the +X direction by the cable guide 23.

Figure 15:
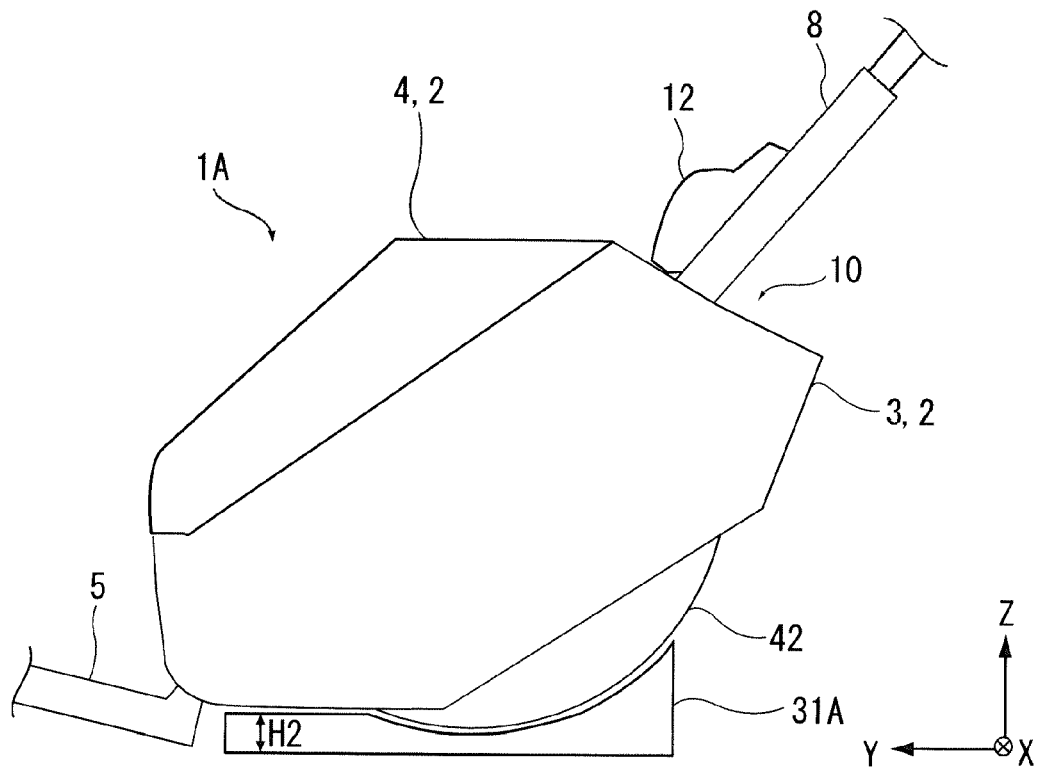
FIG. 15 is a view for explaining another configuration of the scanner.

In addition, as illustrated in FIG. 15, by replacing the main body support member 31 of the present embodiment with a main body support member 31A, the height of which is smaller than a height H1 (FIG. 2) of the main body support member 31, the scanner 1 can be formed into a scanner 1A. A height H2 of the main body support member 31A is smaller than the height H1 of the main body support member 31.

The main body support member 31A can reduce the size thereof in the height direction when, for example, the switcher 30 is not provided. The scanner 1A can be a model in which the attitude of the apparatus main body 2 is fixed at, for example, the second attitude. Since the main body support member 31A does not require the switcher 30 and has a small size, the main body support member 31A can be manufactured at a lower cost than the main body support member 31. Therefore, the scanner 1A the size of which in the height direction is small and which is inexpensive, can be easily manufactured.

Moreover, in the present embodiment, even though the switcher 30 switches the apparatus main body 2 between three attitudes of the first attitude, the second attitude, and the third attitude, for example, the apparatus main body 2 can be configured to be switched between two attitudes, namely, a storage attitude and an attitude in which the medium P can be transported, like between the first attitude and the second attitude, or between the first attitude and the third attitude.

In addition, in the present embodiment, although the feed tray 8 in the second state and the discharge tray 5 in the fourth state are configured so as not to cover the same portion of the apparatus main body 2, the feed tray 8 in the second state and the discharge tray 5 in the fourth state may be configured to overlap to cover the same portion of the apparatus main body 2.

Modification of First Embodiment

In addition, in the first embodiment, although the scanner 1 is configured such that the discharge unit 18 faces downward in the second attitude, the discharge unit 18 can be configured to face upward in the second attitude like in a scanner 1B as a modification of the first embodiment illustrated in the right diagram of FIG. 17.

Figure 16:
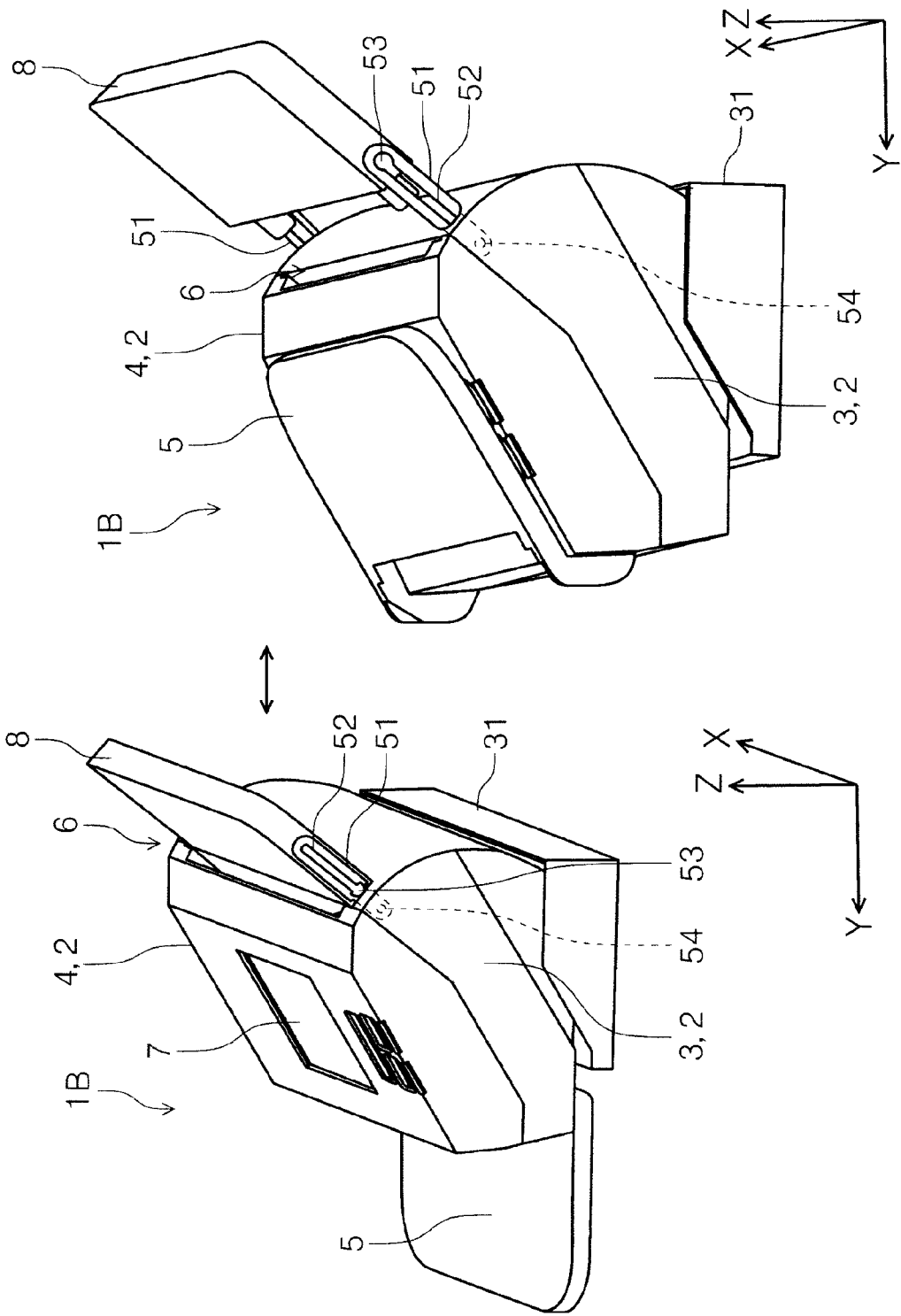
FIG. 16 is a perspective view for explaining a modification of a first embodiment.

In the first attitude of the apparatus main body 2 illustrated in the left diagram of FIG. 16, the feed tray 8 is in a first state in which the feed tray 8 can support the medium P. In addition, in the second attitude of the apparatus main body 2 illustrated in the right diagram of FIG. 17, the feed tray 8 is brought into a second state in which the feed tray 8 covers the upper unit 4.

As illustrated in the left diagram of FIG. 16, when the scanner 1B is set to the second attitude in which the discharge unit 18 faces upward from a state where the scanner 1B takes the first attitude, as illustrated in the right diagram of FIG. 17, the apparatus main body 2 can be made more compact by attaching the feed tray 8 to the apparatus main body 2 via an arm portion 51.

The arm portion 51 has an elongated hole 52 and is attached to a main body side shaft portion 54 inside the apparatus main body 2 so as to be pivotable, and a tray side shaft portion 53 of the feed tray 8 is fitted in the elongated hole 52.

As illustrated in the left diagram of FIG. 16, when the feed tray 8 is attached in the first state in which the feed tray 8 can support the medium P, the tray side shaft portion 53 is located at an end portion of the elongated hole 52 on the +Y side close to the apparatus main body 2.

In the case where the feed tray 8 is changed from the first state illustrated in the left diagram of FIG. 16 to the second state illustrated in the right diagram of FIG. 17, the feed tray 8 is pulled obliquely upward toward the rear of the apparatus as illustrated in the right diagram of FIG. 16. At that time, the tray side shaft portion 53 can move toward the end portion of the elongated hole 52 on the −Y side away from the apparatus main body 2.

As illustrated in the left view of FIG. 17, when the apparatus main body 2 is pivoted to the second attitude in which the discharge unit 18 faces upward, the arm portion 51 pivots with respect to the main body side shaft portion 54, and the feed tray 8 pivots with respect to the tray side shaft portion 53 so that the medium support surface of the feed tray 8 approaches the upper unit 4 as the apparatus main body 2.

Then, as illustrated in the right diagram of FIG. 17, the apparatus main body 2 becomes in the second attitude in which the discharge unit 18 faces upward, and the feed tray 8 becomes in the second state in which the feed tray 8 covers the apparatus main body 2.

In addition, it goes without saying that the present disclosure is not limited to the above embodiment, and various modifications are possible within the scope of the disclosure described in the claims, and they are also included in the scope of the present disclosure.

What is claimed is:

1. An image reading apparatus comprising:
   an apparatus main body including a medium transport path from a supply unit, which supplies a medium, to a discharge unit, which discharges the medium in a discharge direction;
   a reader that reads an image on the medium supplied from the supply unit;
   a lower unit forming a lower portion of the apparatus main body;
   an upper unit forming an upper portion of the apparatus main body, the upper unit configured to, by pivoting with respect to a pivot shaft provided on a discharge unit side, switch between a closed state in which the upper unit covers the lower unit and an open state in which the lower unit is exposed;
   a support member that supports the apparatus main body, the support member having a support portion that supports the lower unit;
   an engagement portion that is provided with the support member;
   a first engaged portion that is provided with the lower unit, the first engaged portion causing the apparatus main body to be fixed at a first attitude by being engaged the engagement portion;
   a second engaged portion that is provided with the lower unit, the second engaged portion causing the apparatus main body to be fixed at a second attitude by being engaged the engagement portion;
   a third engaged portion that is provided with the lower unit, the third engaged portion causing the apparatus main body to be fixed at a third attitude by being engaged the engagement portion;
   a detection unit that detects the first attitude and the second attitude and the third attitude, the first attitude being an attitude when the discharge direction of the medium from the medium transport path takes a first inclination angle with respect to the mounting surface, the second attitude being an attitude when the discharge direction of the medium from the medium transport path takes a second inclination angle with respect to the mounting surface, the third attitude being an attitude when the discharge direction of the medium from the medium transport path takes a third inclination angle with respect to the mounting surface; and
   a controller that, when an attitude of the apparatus main body with respect to the mounting surface is switched, performs control in accordance with the attitude after the switching based on a detection result of the detection unit,
   wherein the second inclination angle is closer to a vertical angle than the first inclination angle, and
   wherein the third inclination angle is closer to a horizontal angle than the first inclination angle.

2. The medium transport apparatus according to claim 1, wherein
   the controller turns off apparatus power when the apparatus main body is switched to the second attitude.

3. The medium transport apparatus according to claim 1, wherein
   the apparatus main body includes, at a top portion thereof, a displayer that displays content related to apparatus operation, and
   the controller, when the apparatus main body is in the first attitude, sets a display on the displayer to a first orientation in which the display is read, in plan view of the apparatus main body, with downstream down and upstream up in the discharge direction, and, when the apparatus main body is in the third attitude, sets the display on the displayer to a second orientation rotated clockwise or counterclockwise 90° from the first orientation.

4. The medium transport apparatus according to claim 1, wherein,
   the controller, when the detection unit does not detect the attitude of the apparatus main body, issues an alert and stops a transport operation in the apparatus main body.

5. The medium transport apparatus according to claim 1, wherein
   the controller stops a transport operation based on the detection result of the plurality of detection units when the switcher is switched during medium transport in the apparatus main body.

6. The medium transport apparatus according to claim 1, further comprising
   an operation restrictor configured to, under control of the controller, switch between a restricting state in which operation of the switcher is restricted and a permitting state in which operation of the switcher is permitted, wherein the controller puts the operation restrictor in the restricting state during medium transport in the apparatus main body.

7. The medium transport apparatus according to claim 1, wherein the apparatus main body includes
a pivot restrictor configured to, under control of the controller, switch between a pivot restricting state in which pivoting of the upper unit from the closed state to the open state is restricted, and a pivot permitting state in which pivoting of the upper unit from the closed state to the open state is permitted, wherein the controller puts the pivot restrictor in the pivot restricting state when the apparatus main body is in an attitude other than the second attitude, and
wherein the apparatus main body in the second attitude is configured such that the discharge unit faces downward.

8. The medium transport apparatus according to claim 1, further comprising:
a feed tray that is provided so as to pivot relative to the apparatus main body and is configured to switch between a first state in which the feed tray supports the medium to be fed to the medium transport path and a second state in which the feed tray covers a portion of the apparatus main body; and
a discharge tray that is provided so as to pivot relative to the apparatus main body and configured to switch between a third state in which the discharge tray supports the medium discharged from the medium transport path, and a fourth state in which the discharge tray covers a portion of the apparatus main body, wherein
the feed tray in the second state and the discharge tray in the fourth state are configured not to cover an identical portion of the apparatus main body.

9. The medium transport apparatus according to claim 8, further comprising
any one of
an auxiliary feed tray configured to switch between a first advanced state in which the auxiliary feed tray is advanced to a free end side with respect to the feed tray, and a first storage state in which the auxiliary feed tray is stored in the feed tray, and
an auxiliary discharge tray configured to switch between a second advanced state in which the auxiliary discharge tray is advanced to a free end side with respect to the discharge tray, and a second storage state in which the auxiliary discharge tray is stored in the discharge tray.

10. The medium transport apparatus according to claim 1, further comprising
a connection portion that enables connection of a cable to the apparatus main body, wherein
the connection portion is disposed so as to enable insertion and removal of the cable regardless of the attitude of the apparatus main body.

11. An image reading apparatus comprising:
an apparatus main body including a medium transport path from a supply unit, which supplies a medium, to a discharge unit, which discharges the medium in a discharge direction;
a reader that reads an image on the medium supplied from the supply unit;
a lower unit forming a lower portion of the apparatus main body;
an upper unit forming an upper portion of the apparatus main body, the upper unit configured to, by pivoting with respect to a pivot shaft provided on a discharge unit side, switch between a closed state in which the upper unit covers the lower unit and an open state in which the lower unit is exposed;
a support member that supports the apparatus main body, the support member having a support portion that supports the lower unit;
an engagement portion that is provided with the support member;
a first engaged portion that is provided with the lower unit, the first engaged portion causing the apparatus main body to be fixed at a first attitude by being engaged the engagement portion;
a third engaged portion that is provided with the lower unit, the third engaged portion causing the apparatus main body to be fixed at a third attitude by being engaged the engagement portion;
a detection unit that detects the first attitude and the third attitude, the first attitude being an attitude when the discharge direction of the medium from the medium transport path takes a first inclination angle with respect to the mounting surface, the third attitude being an attitude when the discharge direction of the medium from the medium transport path takes a third inclination angle with respect to the mounting surface; and
a controller that, when an attitude of the apparatus main body with respect to the mounting surface is switched, performs control in accordance with the attitude after the switching based on a detection result of the detection unit,
wherein the third inclination angle is closer to a horizontal angle than the first inclination angle.

* * * * *